US009179019B2

(12) United States Patent
Kahle

(10) Patent No.: US 9,179,019 B2
(45) Date of Patent: Nov. 3, 2015

(54) DIGITAL MICROFORM IMAGING APPARATUS

(71) Applicant: e-ImageData Corp., Hartford, WI (US)

(72) Inventor: Todd A Kahle, Hartford, WI (US)

(73) Assignee: E-IMAGEDATA CORP., Hartford, WI (US)

(*) Notice: Subject to any disclaimer, the term of this patent is extended or adjusted under 35 U.S.C. 154(b) by 0 days.

(21) Appl. No.: 13/968,080

(22) Filed: Aug. 15, 2013

(65) Prior Publication Data

US 2014/0015958 A1 Jan. 16, 2014

Related U.S. Application Data

(63) Continuation of application No. 13/560,283, filed on Jul. 27, 2012, now Pat. No. 8,537,279, which is a continuation of application No. 11/748,692, filed on May 15, 2007, now Pat. No. 8,269,890.

(51) Int. Cl.
| | |
|---|---|
| *G03B 37/04* | (2006.01) |
| *H04N 1/00* | (2006.01) |
| *G03B 21/11* | (2006.01) |
| *G03B 27/34* | (2006.01) |
| *G03B 27/53* | (2006.01) |
| *H04N 1/024* | (2006.01) |

(Continued)

(52) U.S. Cl.
CPC ............ *H04N 1/00267* (2013.01); *G03B 21/11* (2013.01); *G03B 27/34* (2013.01); *G03B 27/53* (2013.01); *H04N 1/028* (2013.01); *H04N 1/0288* (2013.01); *H04N 1/02409* (2013.01); *H04N 1/02805* (2013.01); *H04N 1/19589* (2013.01); *G03B 17/02* (2013.01); *H04N 1/195* (2013.01); *H04N 2201/041* (2013.01)

(58) Field of Classification Search
CPC ......... G03B 21/11; G03B 17/02; G03B 37/04
USPC ..................................... 348/487, 373; 382/14
See application file for complete search history.

(56) References Cited

U.S. PATENT DOCUMENTS

| | | |
|---|---|---|
| 3,836,251 A | 9/1974 | Hertel et al. |
| 4,870,294 A | 9/1989 | Hasegawa |

(Continued)

FOREIGN PATENT DOCUMENTS

JP 2000356800 A 12/2000

OTHER PUBLICATIONS

S-T Imaging, Inc., "Got Film? ST200X" Brochure, circa 2004, 4 pages.

(Continued)

*Primary Examiner* — Khanh Dinh
(74) *Attorney, Agent, or Firm* — Quarles & Brady LLP

(57) ABSTRACT

A microform imaging apparatus comprising a chassis including a microform media support structure configured to support a microform media within a plane substantially orthogonal to a first optical axis, a fold mirror supported along the first optical axis to reflect light along a second optical axis that is angled with respect to the first optical axis, a lens supported along one of the first and second optical axis, an area sensor supported along the second optical axis, a first adjuster for moving the area sensor along at least a portion of the second optical axis and a second adjuster for moving the lens along at least a portion of the one of the first and second optical axis.

101 Claims, 15 Drawing Sheets

(51) Int. Cl.
*H04N 1/028* (2006.01)
*G03B 17/02* (2006.01)
*H04N 1/195* (2006.01)

(56) References Cited

U.S. PATENT DOCUMENTS

| | | | |
|---|---|---|---|
| 5,061,955 A | 10/1991 | Watanabe | |
| 5,133,024 A | 7/1992 | Froessl | |
| 5,137,347 A | 8/1992 | Imai | |
| 5,241,659 A | 8/1993 | Parulski et al. | |
| 5,477,343 A | 12/1995 | Nodelman et al. | |
| 5,586,196 A | 12/1996 | Sussman | |
| 5,647,654 A | 7/1997 | Krzywdziak et al. | |
| 5,726,773 A | 3/1998 | Mehlo et al. | |
| 6,057,941 A | 5/2000 | Furukawa et al. | |
| 6,301,398 B1 | 10/2001 | Kimball et al. | |
| 6,339,483 B1 | 1/2002 | Hoshino et al. | |
| 6,476,979 B1 | 11/2002 | Schaack | |
| 7,797,528 B2* | 9/2010 | Lapstun et al. | 713/150 |
| 7,880,807 B2* | 2/2011 | Gupta | 348/373 |
| 7,949,868 B2* | 5/2011 | Lapstun et al. | 713/150 |
| 7,965,257 B2* | 6/2011 | Perkins et al. | 345/1.3 |
| 8,269,890 B2* | 9/2012 | Kahle | 348/487 |
| 8,537,279 B2* | 9/2013 | Kahle | 348/487 |
| 8,684,527 B2* | 4/2014 | Warden et al. | 351/205 |
| 2004/0012827 A1 | 1/2004 | Fujinawa et al. | |
| 2007/0103739 A1 | 5/2007 | Anderson, Jr. et al. | |
| 2008/0284847 A1 | 11/2008 | Kahle | |
| 2008/0288888 A1 | 11/2008 | Kahle et al. | |
| 2012/0008820 A1 | 1/2012 | Kahle et al. | |

OTHER PUBLICATIONS

*E-ImageData Corp. v Konica Minolta Business Solutions U.S.A., Inc., et al.*, 3:12-cv-686, Complaint for Patent Infringement (W.D. Wisc. Sep. 20, 2012), 5 pages.
*E-ImageData Corp. v Konica Minolta Business Solutions U.S.A., Inc., et al.*, 3:12-cv-686, Konica Minolta Business Solutions U.S.A., Inc.'s Answer to Plaintiff's Complaint (W.D. Wisc. Nov. 16, 2012), 9 pages.
*E-ImageData Corp. v Konica Minolta Business Solutions U.S.A., Inc., et al.*, 3:12-cv-686, Naviant, Inc.'s Answer to Plaintiff's Complaint (W.D. Wisc. Nov. 6, 2012), 9 pages.
*E-ImageData Corp. v Konica Minolta Business Solutions U.S.A., Inc., et al.*, 3:12-cv-686, Indus International, Inc.'s Answer to Plaintiff's Complaint (W.D. Wisc. Nov. 16, 2012), 9 pages.
*E-ImageData Corp. v Konica Minolta Business Solutions U.S.A., Inc., et al.*, 3:12-cv-686, First Amended Complaint for Patent Infringement (W.D. Wisc. Nov. 29, 2012), 5 pages.
*E-ImageData Corp. v Konica Minolta Business Solutions U.S.A., Inc., et al.*, 3:12-cv-686, Konica Minolta Business Solutions U.S.A., Inc.'s Answer to Plaintiff's First Amended Complaint (W.D. Wisc. Dec. 13, 2012), 9 pages.
*E-ImageData Corp. v Konica Minolta Business Solutions U.S.A., Inc., et al.*, 3:12-cv-686, Naviant, Inc.'s Answer to Plaintiff's First Amended Complaint (W.D. Wisc. Dec. 13, 2012), 9 pages.
*E-ImageData Corp. v Konica Minolta Business Solutions U.S.A., Inc., et al.*, 3:12-cv-686, Indus International, Inc.'s Answer to Plaintiff's First Amended Complaint (W.D. Wisc. Dec. 13, 2012), 9 pages.
*E-ImageData Corp. v Konica Minolta Business Solutions U.S.A., Inc., et al.*, 3:12-cv-686, Second Amended Complaint for Patent Infringement (W.D. Wisc. Jan. 16, 2013), 5 pages.
*E-ImageData Corp. v Konica Minolta Business Solutions U.S.A., Inc., et al.*, 3:12-cv-686, Konica Minolta Business Solutions U.S.A., Inc.'s Answer to Plaintiff's Second Amended Complaint (W.D. Wisc. Jan. 30, 2013), 9 pages.
*E-ImageData Corp. v Konica Minolta Business Solutions U.S.A., Inc., et al.*, 3:12-cv-686, Naviant, Inc.'s Answer to Plaintiff's Second Amended Complaint (W.D. Wisc. Jan. 30, 2013), 9 pages.
*E-ImageData Corp. v Konica Minolta Business Solutions U.S.A., Inc., et al.*, 3:12-cv-686, Indus International, Inc.'s Answer to Plaintiff's Second Amended Complaint (W.D. Wisc. Jan. 30, 2013), 9 pages.
*E-ImageData Corp. v Konica Minolta Business Solutions U.S.A., Inc., et al.*, 3:12-cv-686, Third Amended Complaint for Patent Infringement (W.D. Wisc. Nov. 12, 2013), 5 pages.
*E-ImageData Corp. v Konica Minolta Business Solutions U.S.A., Inc., et al.*, 3:12-cv-686, Konica Minolta Business Solutions U.S.A., Inc.'s Answer to Plaintiff's Third Amended Complaint (W.D. Wisc. Dec. 3, 2013), 9 pages.
*E-ImageData Corp. v Konica Minolta Business Solutions U.S.A., Inc., et al.*, 3:12-cv-686, Naviant, Inc.'s Answer to Plaintiff's Third Amended Complaint (W.D. Wisc. Dec. 3, 2013), 9 pages.
*E-ImageData Corp. v Konica Minolta Business Solutions U.S.A., Inc., et al.*, 3:12-cv-686, Indus International, Inc.'s Answer to Plaintiff's Third Amended Complaint (W.D. Wisc. Dec. 3, 2013), 9 pages.
*E-ImageData Corp. v Konica Minolta Business Solutions U.S.A., Inc., et al.*, 3:13-cv-721, Complaint for Patent Infringement (W.D. Wisc. Oct. 16, 2013), 30 pages.
*E-ImageData Corp. v Konica Minolta Business Solutions U.S.A., Inc., et al.*, 3:12-cv-721, Konica Minolta Business Solutions U.S.A., Inc.'s Answer to Plaintiff's Complaint (W.D. Wisc. Dec. 20, 2013), 9 pages.
*E-ImageData Corp. v Konica Minolta Business Solutions U.S.A., Inc., et al.*, 3:12-cv-721, Naviant, Inc.'s Answer to Plaintiff's Complaint (W.D. Wisc. Dec. 20, 2013), 9 pages.
*E-ImageData Corp. v Konica Minolta Business Solutions U.S.A., Inc., et al.*, 3:12-cv-721, Indus International, Inc.'s Answer to Plaintiff's Complaint (W.D. Wisc. Dec. 20, 2013), 9 pages.
*E-ImageData Corp. v Konica Minolta Business Solutions U.S.A., Inc., et al.*, 3:12-cv-686 & 3:12-cv-721, Stipulation of Dismissal With Prejudice (W.D. Wisc. Jan. 5, 2015), 2 pages.
*E-ImageData Corp. v Konica Minolta Business Solutions U.S.A., Inc., et al.*, 3:12-cv-686, Defendants' Corrected Invalidity/Unenforceability Contentions (W.D. Wisc. Mar. 13, 2013), 160 pages.
*E-ImageData Corp. v Konica Minolta Business Solutions U.S.A., Inc., et al.*, 3:12-cv-686, Plaintiff E-ImageData Corp.'s Disclosure of Proposed Claim Constructions (W.D. Wisc. May 22, 2013), 2 pages.
*E-ImageData Corp. v Konica Minolta Business Solutions U.S.A., Inc., et al.*, 3:12-cv-686, Defendants' Terms and Proposed Constructions (W.D. Wisc. May 22, 2013), 3 pages.
*E-ImageData Corp. v Konica Minolta Business Solutions U.S.A., Inc., et al.*, 3:12-cv-686, Plaintiff E-ImageData Corp.'s Responses to Defendants' Proposed Constructions (W.D. Wisc. Jun. 19, 2013), 2 pages.
*E-ImageData Corp. v Konica Minolta Business Solutions U.S.A., Inc., et al.*, 3:12-cv-686, Defendants' Responses to Plaintiff's Proposed Constructions (W.D. Wisc. Jun. 19, 2013), 4 pages.
*E-ImageData Corp. v Konica Minolta Business Solutions U.S.A., Inc., et al.*, 3:12-cv-686 & 3:12-cv-721, Defendants' Invalidity/Unenforceability Contentions (W.D. Wisc. Mar. 28, 2014), 18 pages.
*E-ImageData Corp. v Konica Minolta Business Solutions U.S.A., Inc., et al.*, 3:12-cv-686, Expert Report of Johnathan Ellis Regarding Infringement of U.S. Pat. No. 8,269,890, with Exhibits 1 & 2 (W.D. Wisc. Aug. 16, 2013), 68 pages.
*E-ImageData Corp. v Konica Minolta Business Solutions U.S.A., Inc., et al.*, 3:12-cv-686, Expert Report of Richard W. Klopp Regarding Invalidity of U.S. Pat. No. 8,269,890, with Exhibits A-L (W.D. Wisc. Aug. 16, 2013), 382 pages.
*E-ImageData Corp. v Konica Minolta Business Solutions U.S.A., Inc., et al.*, 3:12-cv-686, Expert Report of Johnathan Ellis Regarding Validity of U.S. Pat. No. 8,269,890, with Exhibits 1 & 2 (W.D. Wisc. Sep. 30, 2013), 65 pages.
*E-ImageData Corp. v Konica Minolta Business Solutions U.S.A., Inc., et al.*, 3:12-cv-686, Expert Report of Richard W. Klopp Regarding Non-Infringement of U.S. Pat. No. 8,269,890, with Exhibits A & B (W.D. Wisc. Sep. 30, 2013), 71 pages.

* cited by examiner

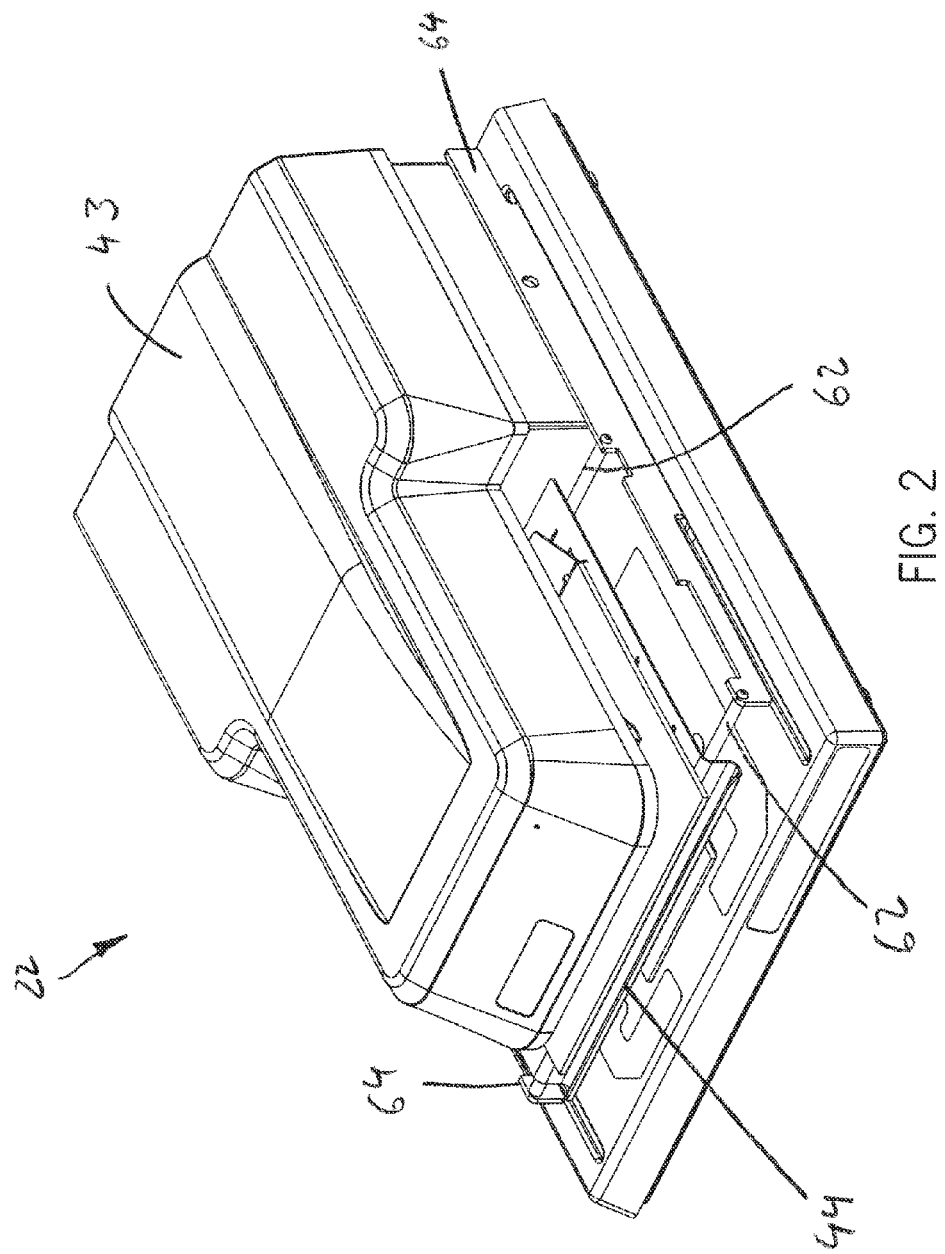

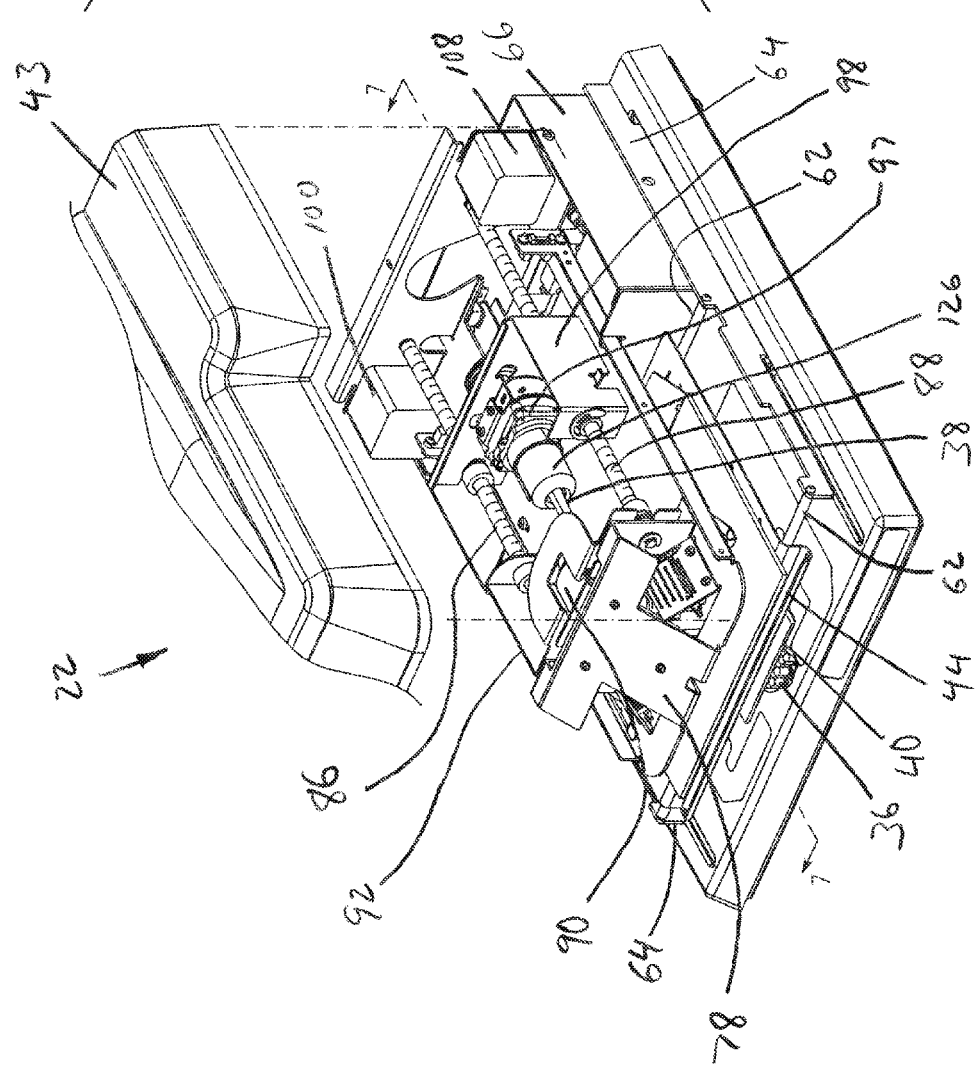

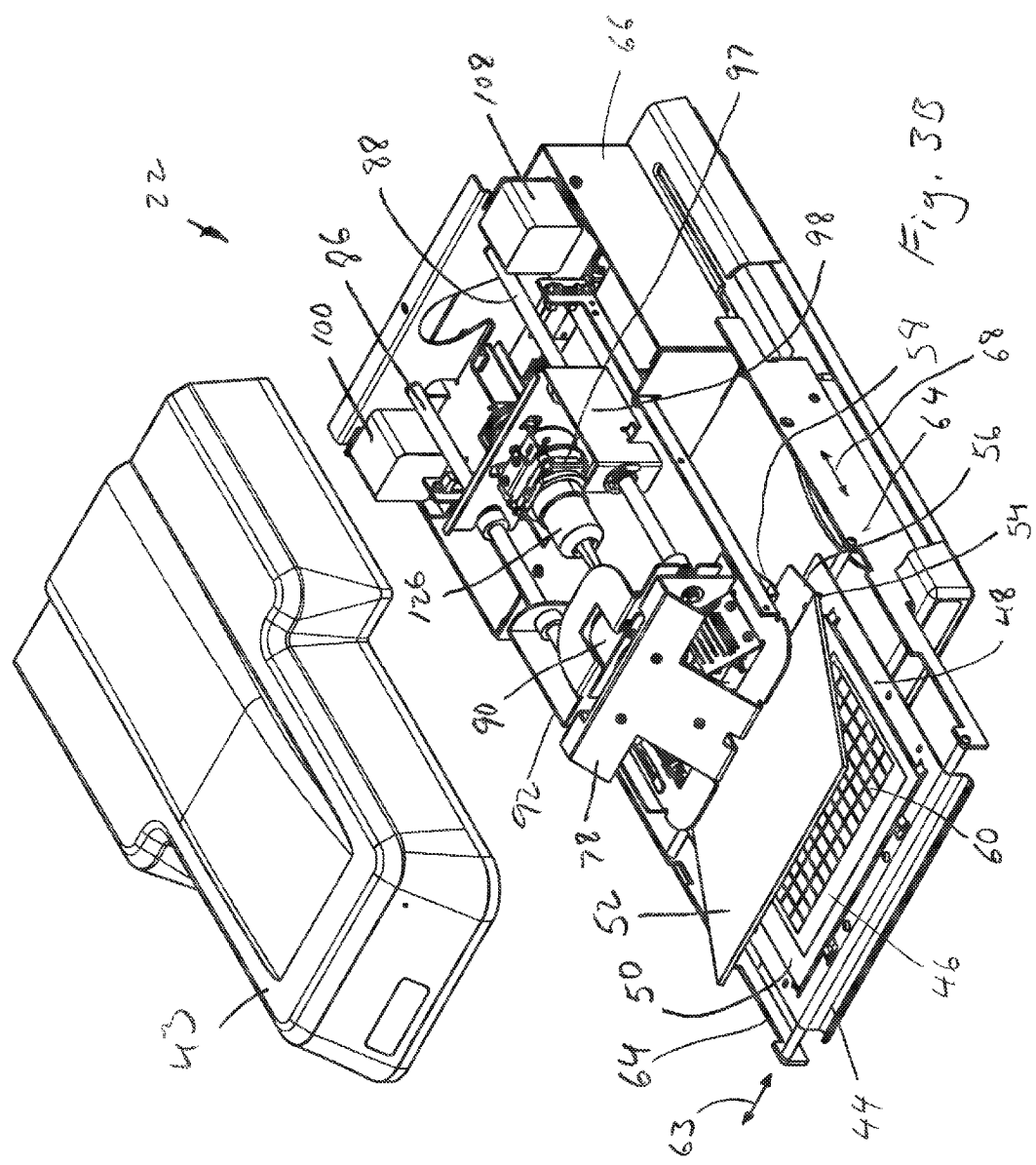

FIG. 12

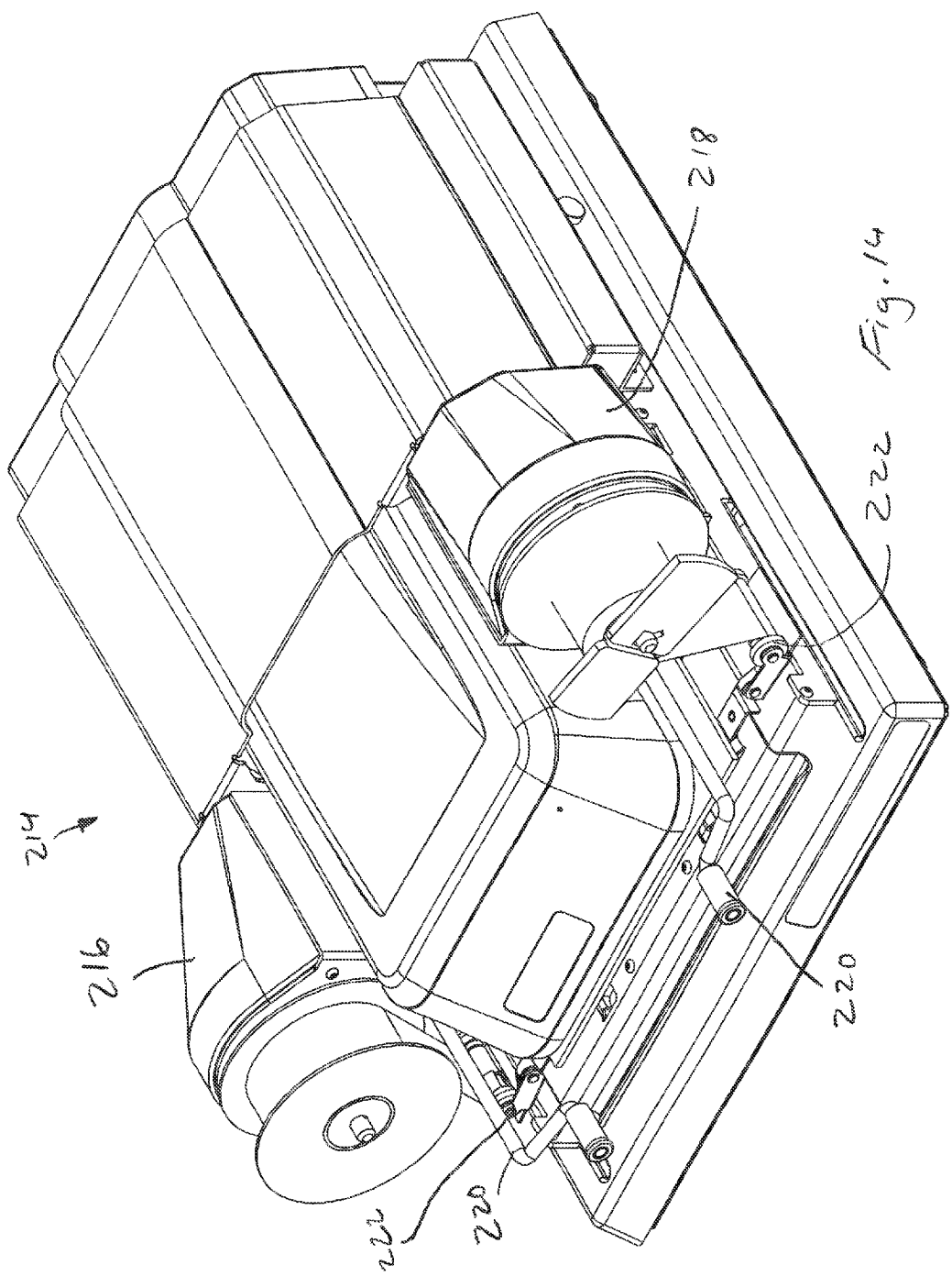

DIGITAL MICROFORM IMAGING APPARATUS

CROSS-REFERENCE TO RELATED APPLICATIONS

This application is a continuation of co-pending U.S. patent application Ser. No. 13/560,283, which was filed on Jul. 27, 2012, and titled "Digital Microform Imaging Apparatus," which is a continuation of U.S. patent application Ser. No. 11/748,692, filed on May 15, 2007, now U.S. Pat. No. 8,269,890, dated Sep. 18, 2012, and titled "Digital Microform Imaging Apparatus," each of which are incorporated herein by reference in their entirety.

FIELD OF THE DISCLOSURE

The present disclosure relates to a digital microform imaging apparatus.

BACKGROUND OF THE DISCLOSURE

Microform images are useful in archiving a variety of documents or records by photographically reducing and recording the document in a film format. Examples of typical microform image formats include microfilm/microfiche, aperture cards, jackets, 16 mm or 35 mm film roll film, cartridge film and other micro opaques. A microfiche article is a known form of graphic data presentation wherein a number of pages or images are photographically reproduced on a single "card" of microfiche film (such as a card of 3×5 inches to 4×6 inches, for example). Any suitable number of pages (up to a thousand or so) may be photographically formed in an orthogonal array on a single microfiche card of photographic film. The microfiche film may then be placed in an optical reader and moved over a rectilinear path until an image or a selected page is in an optical projection path leading to a display screen. Although other electronic, magnetic or optical imaging and storage techniques and media are available, there exists an extensive legacy of film type records storing the likes of newspapers and other print media, business records, government records, genealogical records, and the like.

Past microfilm readers included an integral display which made the reader quite large, see for example U.S. Pat. No. 5,647,654. As the number of images that can be put on a standard size varies, and also the size of the record, for example a typical newspaper page is larger than a typical magazine page, images are recorded on film within a range of reduction ratios (original size/reduced size), and aspect ratio (ratio of height to width of the image, or vice versa). A typical microfilm reader may have a range of zoom or magnification available to accommodate a portion of the reduction ratio range; however, this zoom range is limited and does not accommodate all reduction ratios. Further, in a microfilm reader of the type in the '654 patent, the optical system is enclosed and relatively fixed, and cannot be modified by a user to accommodate a range of reduction ratios for which it is not designed. With the adoption of new storage media such as CDs and DVDs, and the prevalent use of desktop computers in libraries and other facilities which store records, it became apparent that a microfilm reader which acts as a peripheral device to a desktop computer and uses the computer's display for displaying the film's images has several advantages. Such a device is shown in U.S. Pat. No. 6,057,941, for example.

One of the advantages is that a single workstation can accommodate a variety of media such as microfiche or other film, optical media such as CDs and DVDs, and other electronic and magnetic media. Another advantage is that a single display is used for displaying a variety of media images. These advantages have led to the development of microfilm readers which work in conjunction with a desktop computer; however, known peripheral device microfilm readers still have the problem of accommodating a relatively large range of reduction ratios for the film images. One known solution is to provide a peripheral device microfilm reader with multiple zoom lenses to cover the full range of magnification required by the relatively large range of reduction ratios. There are several disadvantages to this approach which include the lenses end up missing or misplaced, the microfilm reader becomes undesirably large, and/or special instructions are required to swap out lenses which makes the different zoom lenses difficult to use. An apparatus and/or method is needed which can accommodate a relatively large range of reduction ratios without the need for changing out parts of the apparatus such as the lenses, or without the need for very expensive zoom lenses.

U.S. Pat. No. 6,301,398 discloses an apparatus for processing microfiche images where two carriages ride on common rails, driven by lead screws and small DC servomotors, where one carriage carries the CCD camera board, and the other carriage carries an objective lens mounted upon a vertically moving lens board. In operation, the system's digital controller solves a simple lens equation based upon three variables: lens focal length, optical reduction ratio and pixel resolution at original document scale, or "dots per inch" (dpi). It then drives the Z-axis carriages to their calculated positions. The controller then commands a succession of image scans, each time displacing the lens carriage slightly. It analyzes the images and then returns the lens carriage to the position giving best focus. Although this system can accommodate a variable optical reduction ratio, it has several disadvantages or limitations. Disadvantages include that the lens carriage is iteratively focused which can cause eye strain if a person is viewing the image during the focusing process, and this process takes time. Another disadvantage is that the leads screws include backlash when reversing direction, which can make the iteratively focusing process difficult and/or imprecise, and the '398 patent is absent disclosure which discusses how to rectify such a problem. Yet another disadvantage is that illumination system, film holder, lens and camera are all in line which creates a bulky system. Yet further, the '398 patent is absent disclosure which indicates what range of reduction ratios it can accommodate.

Other noted U.S. Pat. Nos. 5,137,347; 5,726,773; 3,836,251; and 5,061,955. However, these patents, along with the other cited patents, together or separately, fail to disclose or suggest a compact digital microform imaging apparatus which can easily adapt to a broad range of reduction ratios, and also fail to disclose or suggest such a device while offering other modern features leveraging the potential versatility available in such a system used in conjunction with a computer system.

What is needed in the art is a compact and versatile digital microform imaging apparatus which can easily adapt to a broad range of reduction ratios and media types while providing good resolution of the images and ease of use.

SUMMARY OF THE DISCLOSURE

The invention comprises, in one form thereof, a digital microform imaging apparatus which includes a chassis which has a microform media support structure, and an area sensor rotatably connected to the chassis.

The invention comprises, in another form thereof, a digital microform imaging apparatus which includes an approximately monochromatic illumination source transmitting an incident light through a diffuse window along a first optical axis of the apparatus. A microform media support is configured to support a microform media after the diffuse window and along the first optical axis. An approximately 45 degree fold mirror reflects the incident light transmitted through the microform media approximately 90 degrees along a second optical axis. An imaging subsystem includes a lens connected to a first carriage which is linearly adjustable approximately parallel with the second optical axis, and an area sensor connected to a second carriage which is linearly adjustable approximately parallel with the second optical axis.

The invention comprises, in yet another form thereof, a digital microform imaging apparatus which includes a chassis and an imaging subsystem connected to the chassis. The imaging subsystem has a first lead screw and a second lead screw approximately parallel with the first lead screw. Each lead screw is connected to the chassis. The imaging subsystem includes at least one approximately L-shaped carriage with a first leg threadingly coupled to the first lead screw and slidingly coupled to the second lead screw.

An advantage of an embodiment of the present invention is that it provides a compact microfilm viewer/scanner.

Another advantage of an embodiment of the present invention is that it can accommodate a broad range of image reduction ratios without the need to change zoom lenses.

Yet another advantage of an embodiment of the present invention is that it can accommodate a broad range of microform media types such as all film types and micro opaques.

Yet other advantages of an embodiment of the present invention are that it uses an area sensor to sense the image being displayed thereby eliminating the need for scanning individual images with a line sensor, and resulting in high resolution scans in a relatively short amount of time, for example one second.

Yet another advantage of an embodiment of the present invention is that it provides 360° image rotation.

Yet another advantage of an embodiment of the present invention is that it has low energy usage.

Yet other advantages of an embodiment of the present invention are that it has either autofocus or manual focus.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2 is a perspective view of the digital microform imaging apparatus used in the system of FIG. 1;

FIG. 3A is an exploded perspective view of the digital microform imaging apparatus of FIG. 2;

FIG. 3B is an exploded, fragmentary, perspective view of the digital microform imaging apparatus of FIG. 2, illustrating particularly the X-Y table mobility;

FIG. 12 is a screen shot of an embodiment of a computer user interface of the digital microform imaging system of FIG. 1;

FIG. 14 is a perspective view of another embodiment of a digital microform imaging apparatus according to the present invention, particularly illustrating a hand operated roll film microform media support.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE DISCLOSURE

Figure 1:
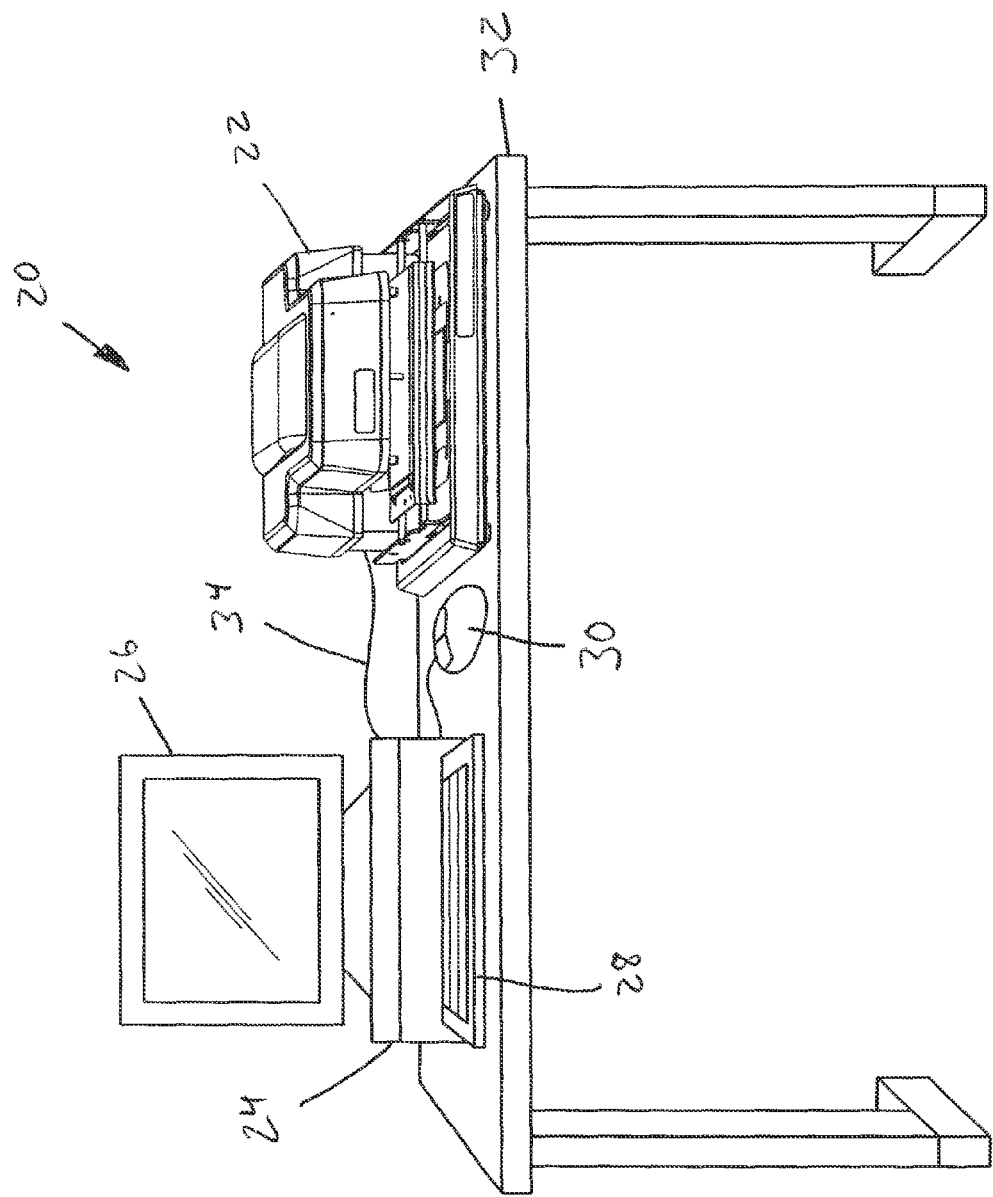
FIG. 1 is a perspective view of an embodiment of a digital microform imaging system according to the present invention.
Figure 4:
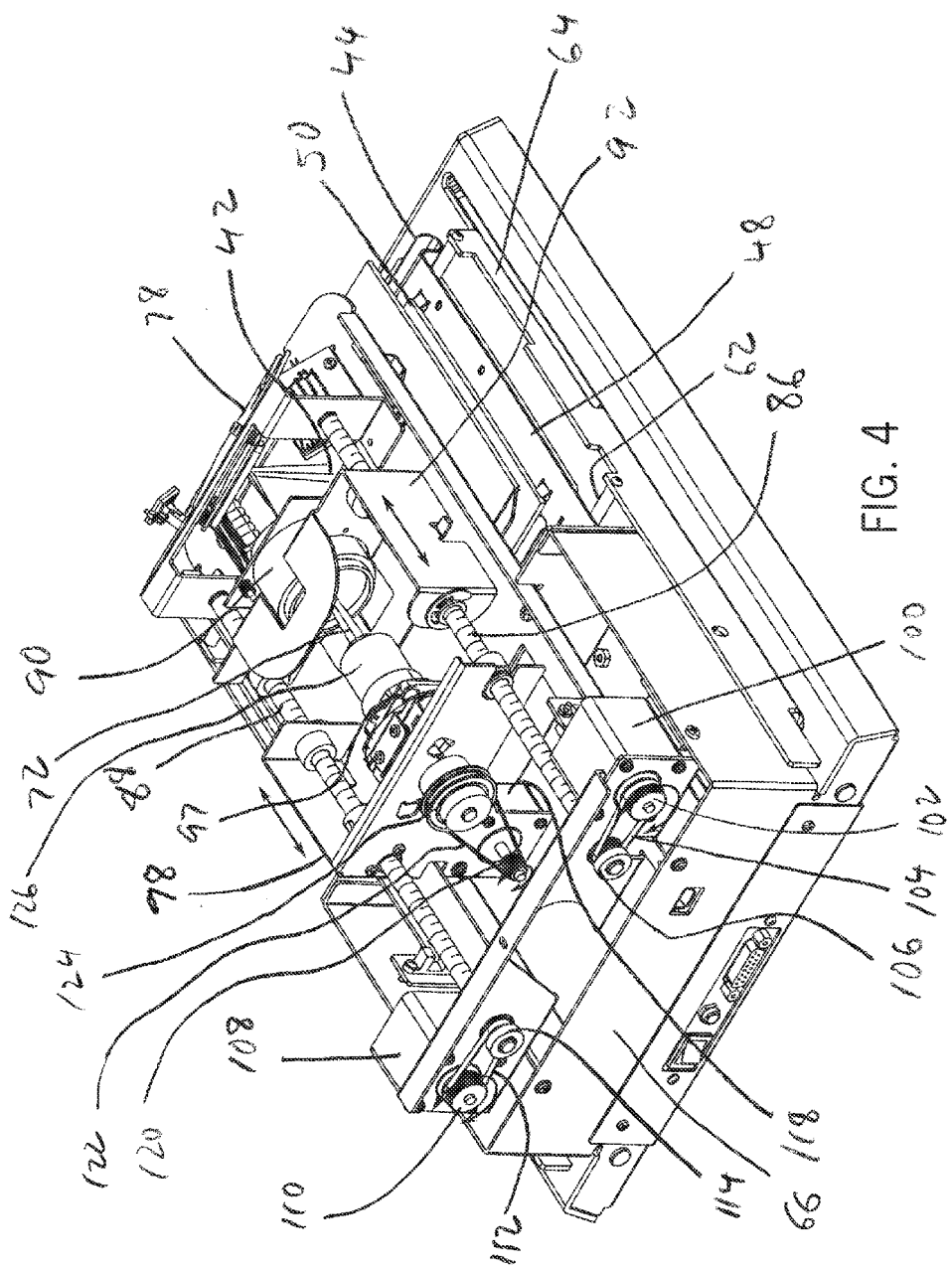
FIG. 4 is a perspective view of the digital microform imaging apparatus of FIG. 2 with the cover removed and as viewed from generally rearward of the apparatus, and particularly illustrating the correlation between the rotational movement of the motors and lead screws, and the translational movement of the carriages.
Figure 5:
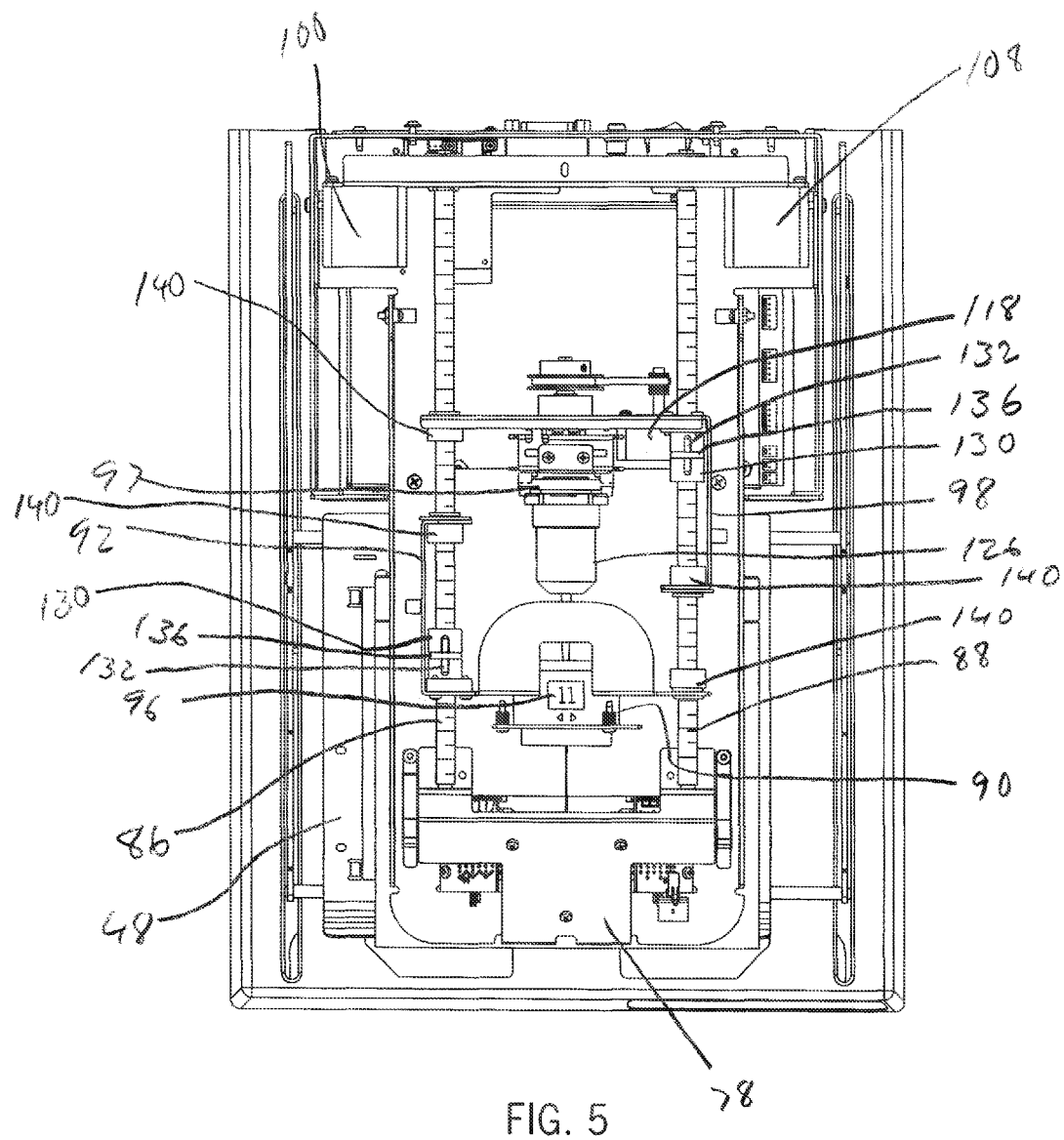
FIG. 5 is a top view of the digital microform imaging apparatus of FIG. 4.

Referring now to the drawings, and more particularly to FIG. 1, there is shown a digital microform imaging system 20 which generally includes digital microform imaging apparatus (DMIA) 22 connected to a computer 24. Computer 24 can include one or more displays 26, and user input devices such as a keyboard 28 and mouse 30. DMIA 22 and computer 24 can be placed on a worksurface 32 of a desk, or other worksurfaces, for convenient access and ease of use. DMIA 22 can be electrically connected to computer 24 via cable 34, which may provide communication using a FireWire IEEE 1394 standard, for example.

Computer 24 can be connected to a printer (not shown) or connected/networked to other computers or peripheral devices (also not shown) to print, store or otherwise convey images produced by DMIA 22. Although cable 34 is described as an electrical type cable, alternatively DMIA 22 and computer 24 can communicate via fiber optics, or wirelessly through infrared or radio frequencies, for example.

Referring more particularly to FIGS. 2-9, DMIA 22 includes an approximately monochromatic illumination source 36, such as a light emitting diode (LED) array or other monochromatic illumination source, transmitting an incident light 38 through a diffuse window 40 along a first optical axis 42 of apparatus 22. Light emitting diode (LED) array 36 can be an approximately 13×9 array of individual LEDs operating in the 495-505 nm wavelength region, although array 36 is not limited to such parameters. The relatively monochromatic nature of source 36 helps reduce chromatic aberration in DMIA 22, thereby improving the optical resolution of the images produced. Diffuse window 40 can be a frosted glass which diffuses the light emanating from array 36, thereby creating a more uniform illumination source. DMIA 22 can include cover 43 to help protect the inner elements of DMIA 22.

A microform media support 44 is configured to support a microform media 46 after diffuse window 40 and along first optical axis 42. In the embodiment shown support 44 is an X-Y table, that is, support 44 is movable in a plane which is approximately orthogonal to first optical axis 42. Referring particularly to FIGS. 3A and 3B, microform media support 44 includes frame 48 which supports first window 50 on one side of microform media 46, and second window 52 on the other side of microform media 46. Second window 52 hinges upward at 54 when frame 48 is moved forward to the extent that lever 56 (connected to second window 52) contacts ramps 58 (one ramp on either side), and similarly, hinges downward at 54 when frame 48 is moved rearward as lever 56 is released from contact with ramp 58. In this way the microform media 46, shown as a microfiche film with an array of images 60, can be placed and held securely between windows 50, 52 for viewing. Frame 48, along with windows 50, 52 and media 46, are slidingly supported on rods 62 by bearings (not shown) to allow a transverse movement 63 of frame 48, windows 50, 52 and media 46. Rods 62 are connected to brackets 64, which brackets are slidingly supported by chassis 66 and bearings (not shown) to allow a longitudinal movement 68 of frame 48, windows 50, 52, media 46 and rods 62.

Figure 6:
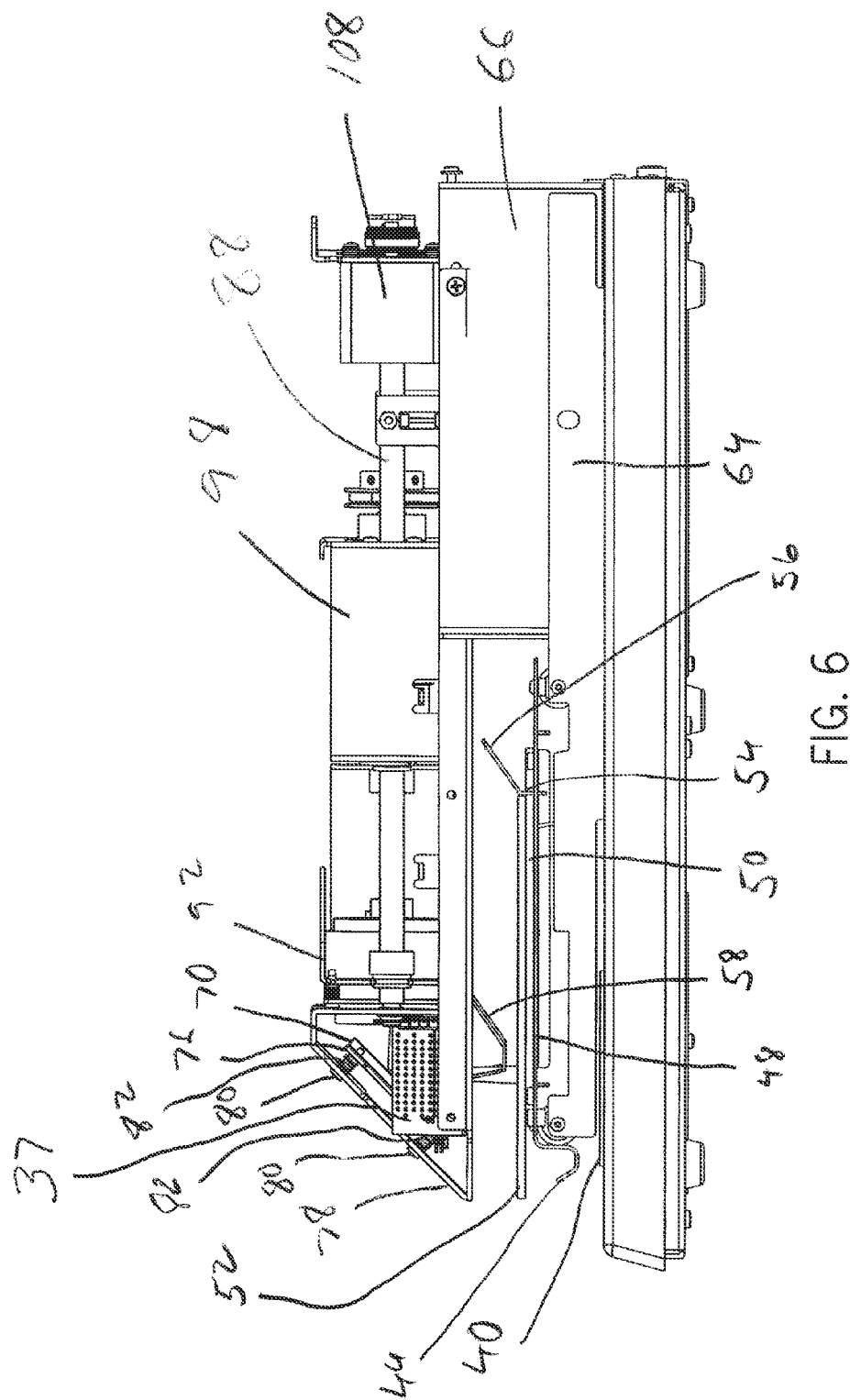
FIG. 6 is a side view of the digital microform imaging apparatus of FIG. 4.
Figure 7:
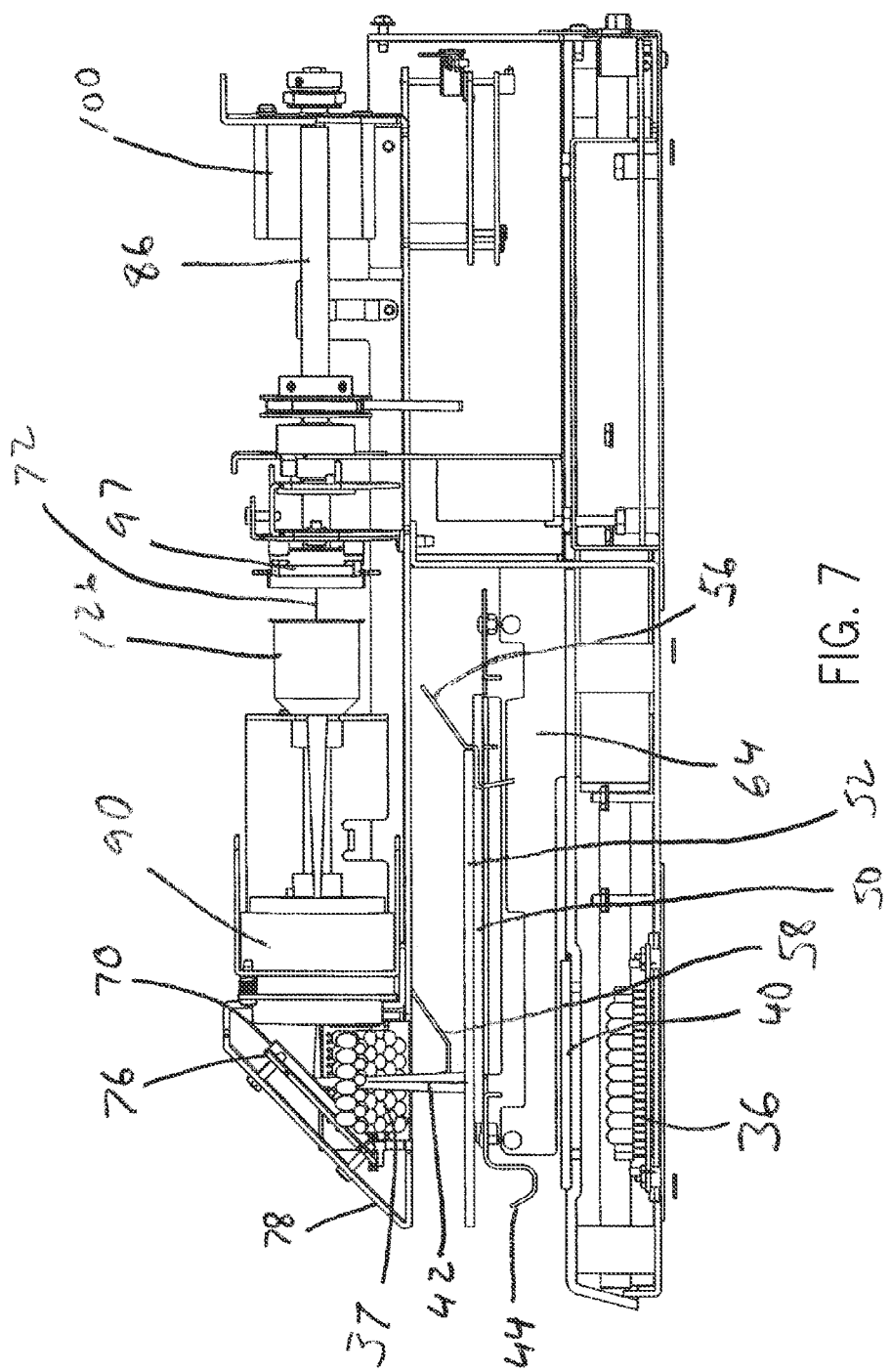
FIG. 7-7 is a cross-sectional view taken along section line 7-7 in FIG. 3A.
Figure 8:
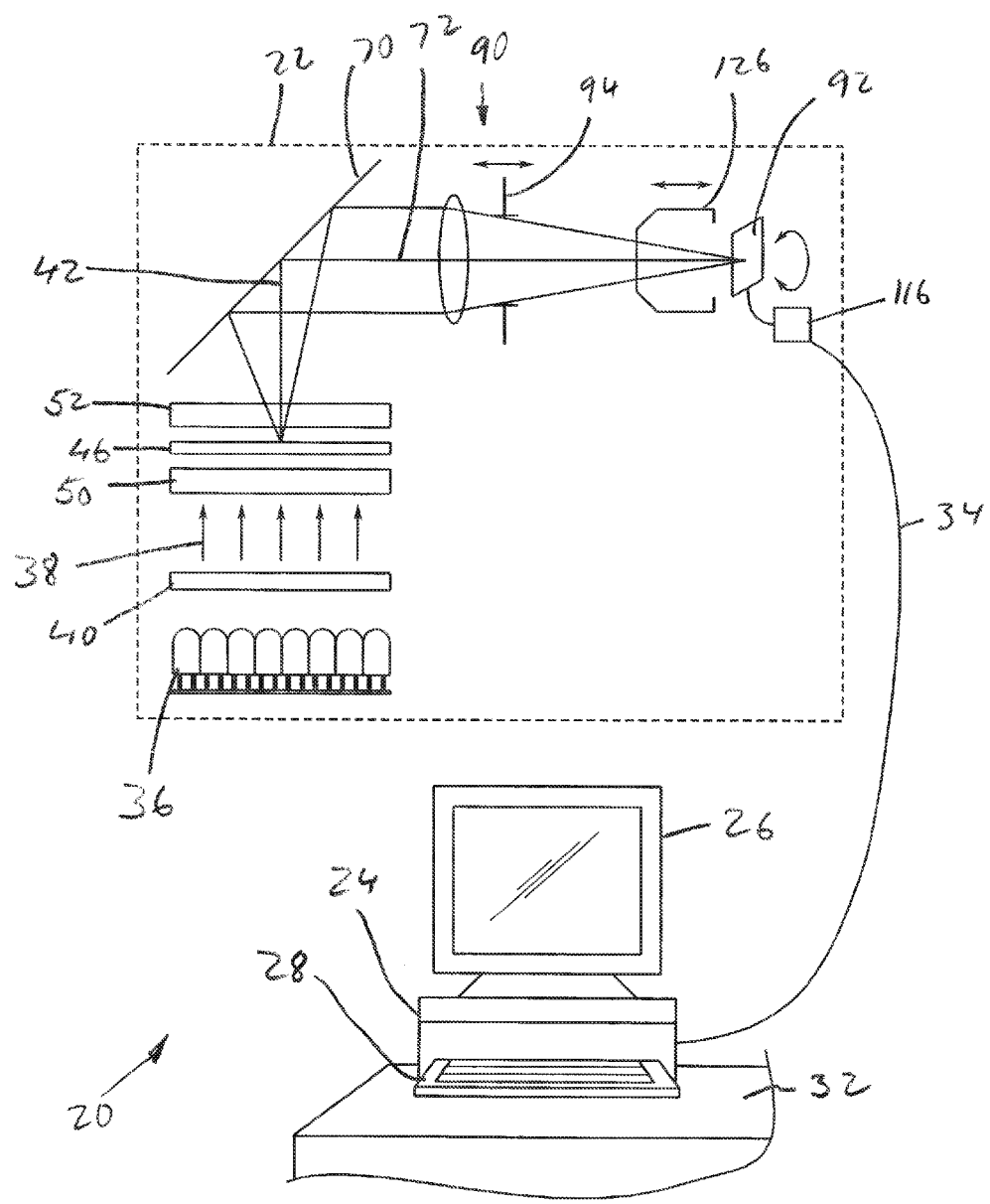
FIG. 8 is a schematic view of the digital microform imaging system of FIG. 1.
Figure 9:
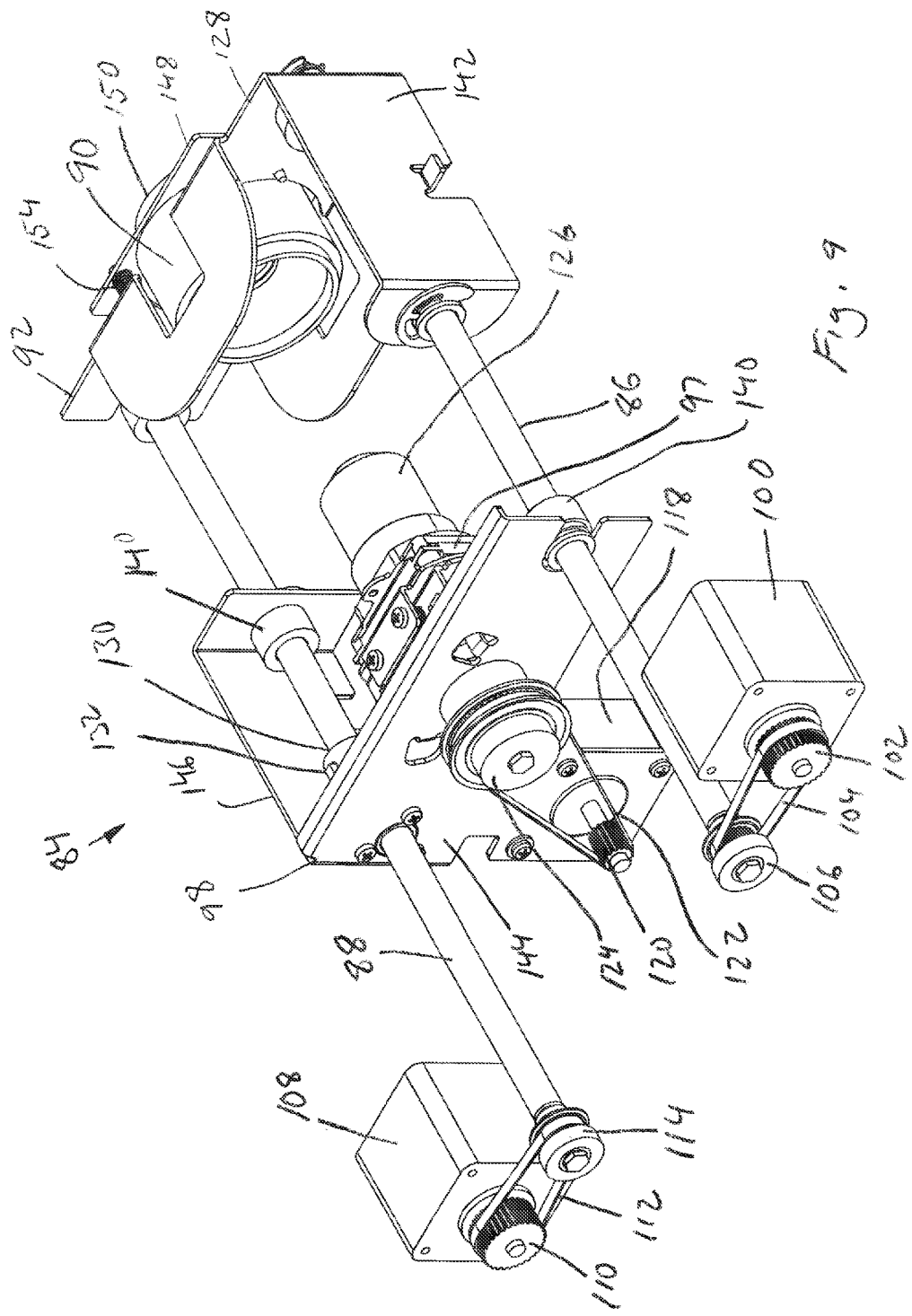
FIG. 9 is a perspective view of the imaging subsystem of the digital microform imaging apparatus of FIG. 2.

Referring particularly to FIGS. 6-8, an approximately 45° fold mirror 70 reflects the incident light transmitted through microform media 46 approximately 90° along a second optical axis 72. First optical axis 42 and second optical axis 72 can be thought of as segments of the single or main optical axis. Mirror 70 is connected by a three point mount 76 to mirror mount 78 by fasteners 80 and springs 82. Mirror mount 78 is connected to chassis 66 as shown. Fold mirror 70 advantageously shortens the overall longitudinal length of the optical axis which allows DMIA 22 to be more compact.

An imaging subsystem 84 includes a first lead screw 86 and a second lead screw 88 where each lead screw is approximately parallel with second optical axis 72. A lens 90 is connected to a first carriage 92 which is linearly adjustable by rotating first lead screw 86. Lens 90 includes stop 94 and f-stop adjustment 96 which can adjust the aperture of stop 94. Lens 90 can have a fixed focal length of 50 mm, for example. This focal length has the advantage of a relatively large depth of focus. A rough formula used to quickly calculate depth of focus is the product of the focal length times the f-stop divided by 1000, which yields a depth of focus of 0.55 mm for a 50 mm focal length and f11 f-stop adjustment. An area sensor 97 is connected to a second carriage 98 which carriage is linearly adjustable by rotating second lead screw 88. Area sensor 97 can be an area array CCD sensor with a two dimensional array of sensor elements or pixels, for example, with a 3.5 µm2 pixel size, or other types of sensors and pixel sizes depending on resolution size requirements. The area array nature of sensor 97, when compared to a line sensor, eliminates the need for scanning of the sensor when viewing two dimensional images. The overall novel optical layout of the present invention including the separately adjustable area sensor 97 and lens 90; 45° fold mirror 70; and film table 44 location; algorithms for moving the lens and sensor to appropriate respective locations to achieve proper magnification and focus of the image; and the lens focal length and relatively large depth of focus, allows DMIA 22 to autofocus without the need for iterative measurements and refocusing the of lens 90 during magnification changes to accommodate different reduction ratios of different film media. Further, the present invention can easily accommodate reduction ratios in the range of 7× to 54×, although the present invention is not limited to such a range.

A first motor 100 is rotationally coupled to first lead screw 86 by timing pulley 102, belt 104 with teeth, and timing pulley 106, and a second motor 108 is rotationally coupled to second lead screw 88 by timing pulley 110, belt 112 with teeth, and timing pulley 114. A controller 116 is electrically connected to first motor 100, second motor 108 and area sensor 97, where controller 116 is for receiving commands and other inputs from computer 24 or other input devices, controlling first motor 100 and second motor 108, and other elements of DMIA 22, and for outputting an image data of area sensor 97. Consequently, controller 116 can include one or more circuit boards which have a microprocessor, field programmable gate array, application specific integrated circuit or other programmable devices; motor controls; a receiver; a transmitter; connectors; wire interconnections including ribbon wire and wiring harnesses; a power supply; and other electrical components. Controller 116 also provides electrical energy and lighting controls for LED array 36. The lead screws serve a dual function of providing guiding elements as well as drive elements for lens and sensor carriages. It is contemplated that the present invention can include alternate designs which can separate these two functions of guiding and driving using, for example, rails or unthreaded rods or a combination thereof for guiding, and a belt or rack and pinion arrangement or a combination thereof for driving.

A third motor 118 is rotationally coupled to area sensor 97, where controller 116 additionally controls third motor 118 through electrical connections as with motors 100 and 108. For example, controller 116 can rotate area sensor 97, using motor 118, timing pulley 120, belt 122 with teeth, and timing pulley 124, to match an aspect ratio of microform media 46, and particularly an aspect ratio of images 60. A light baffle 126 can be connected to area sensor 97 to reduce stray light incident on sensor 97 and thereby further improve the resolution and signal to noise of DMIA 22. Light baffle 126 can have an antireflective coating at the front and inside surfaces of the baffle to further reduce stray light incident on sensor 97. Motors 100, 108 and 118 can be DC servomotors, or other motors.

Figure 10:
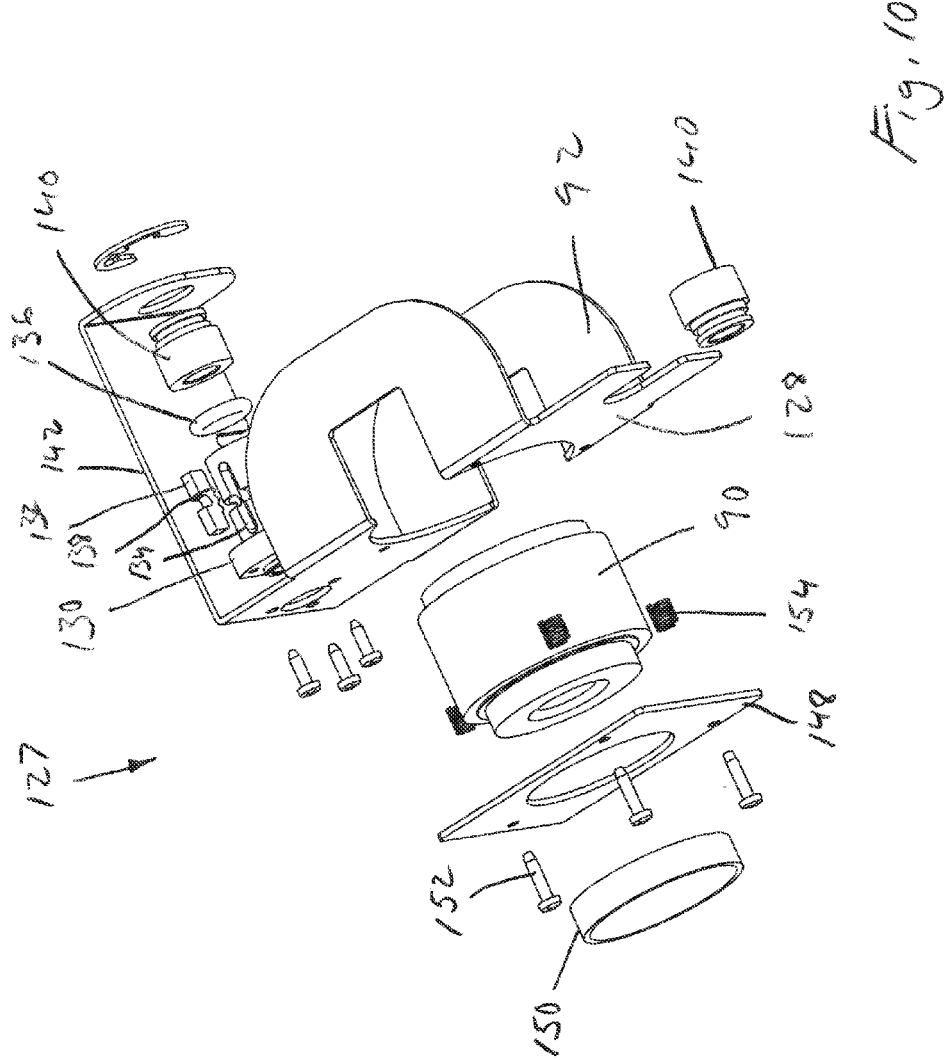
FIG. 10 is an exploded perspective view of the lens carriage assembly of FIG. 9, including among other elements, the lens and lens carriage.
Figure 11:
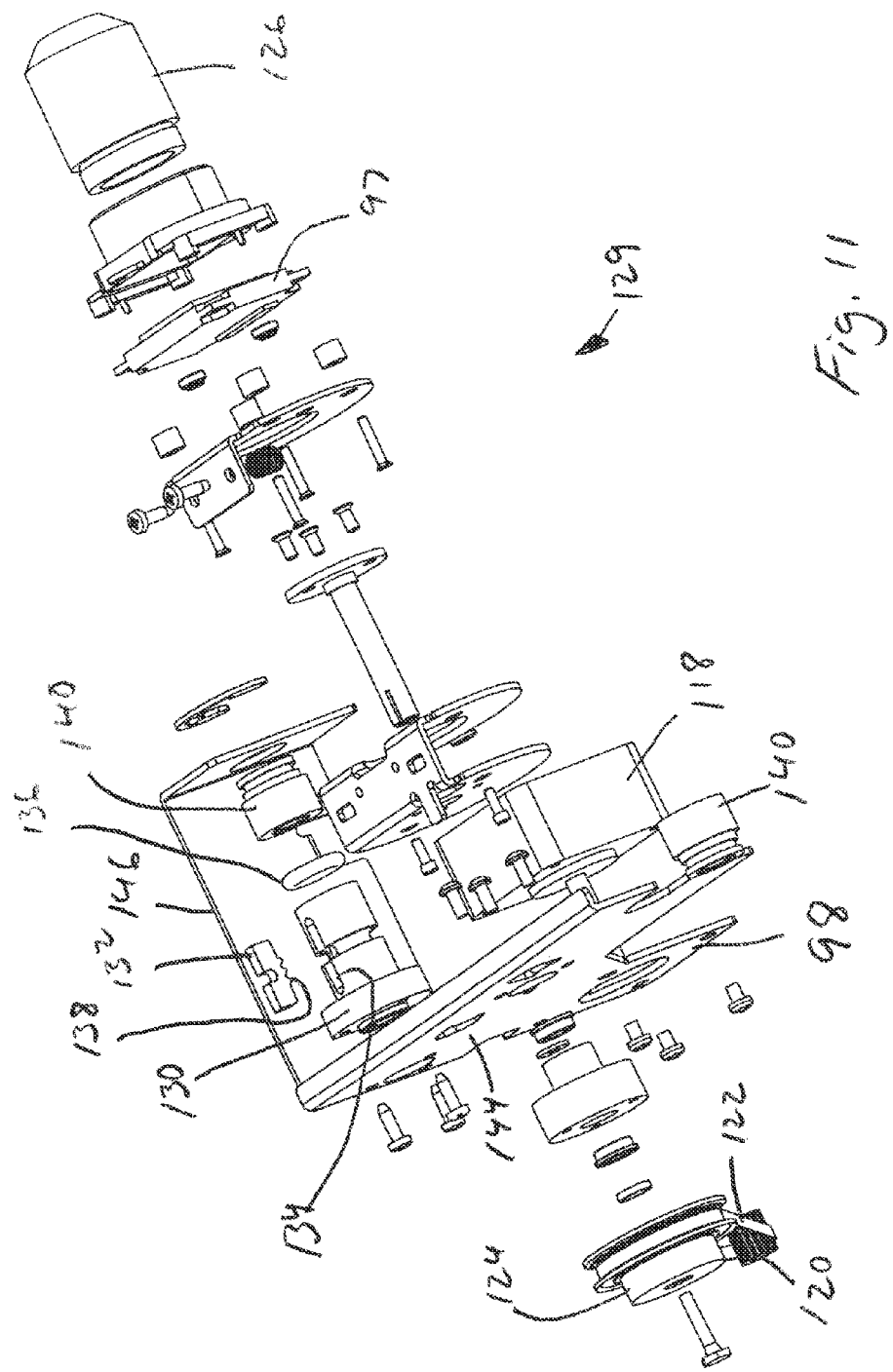
FIG. 11 is an exploded perspective view of the rotating sensor carriage assembly of FIG. 10, including among other elements, the rotating sensor and sensor carriage.

In order to autofocus DMIA 22 without iterations and successive measurements, and for other reasons, it is important that backlash is minimized or eliminated when rotating lead screws 86, 88 to linearly actuate carriages 92, 98. Further, lens 90 and area sensor 97 require a stable platform in order to maintain optical alignment. Referring more particularly to FIGS. 10 and 11 there is shown in detail lens carriage assembly 127 and area sensor carriage assembly 129, respectively. First carriage 92 can be L-shaped with a first leg 128 threadingly coupled to first lead screw 86 using a tubular fitting 130 coaxially mounted with first lead screw 86 and a toothed insert 132 inserted into slot 134 in tubular fitting 130 threadingly engaging at least some of the threads of first lead screw 86. A biasing element in the form of O-ring 136, for example, holds toothed insert 132 in slot 134 and biases toothed insert 132 against the threads of first lead screw 86. The threads of lead screws 86, 88 are approximately rectangular in profile, and teeth 138 of toothed insert 132 are triangular. Further, lead screws 86, 88 can be made from stainless steel whereas toothed insert 132 can be made from a self lubricating polymer such as polyoxymethylene, sometimes referred by the brand name Delrin, or other Nylon-based products such as Nylatron, or other materials. When triangular teeth 138 are inserted into corresponding rectangular threads of lead screws 86, and biased thereto with O-ring 136, one edge of each tooth is always engaging a corresponding edge of the rectangular thread, and the other edge of each tooth is always engaging the other corresponding edge of the rectangular thread. In this way backlash is eliminated because teeth 138 are immediately engaged with the threads regardless of clockwise or counterclockwise motion of the lead screws, and also regardless of their just previous clockwise or counterclockwise motion. First leg 128 is also slidingly coupled to second lead screw 88 with a bushing 140. A second leg 142 is connected to first leg 128, the second leg slidingly coupled to first lead screw 86 with another bushing 140. In a similar manner, second L-shaped carriage 98 includes a third leg 144 threadingly coupled to second lead screw 88 using another tubular fitting 130, toothed insert 132 and O-ring 13, and slidingly coupled to first lead screw 86 using a bushing 140. A fourth leg 146 is connected to third leg 144, where fourth leg 146 is slidingly coupled to second lead screw 88 using another bushing 140.

Lens carriage assembly 127 can include a three point adjustable mount for lens 90 by mounting lens 90 to first carriage 92 using plate 148, ring 150, fasteners 152 and springs 154.

Figure 12:
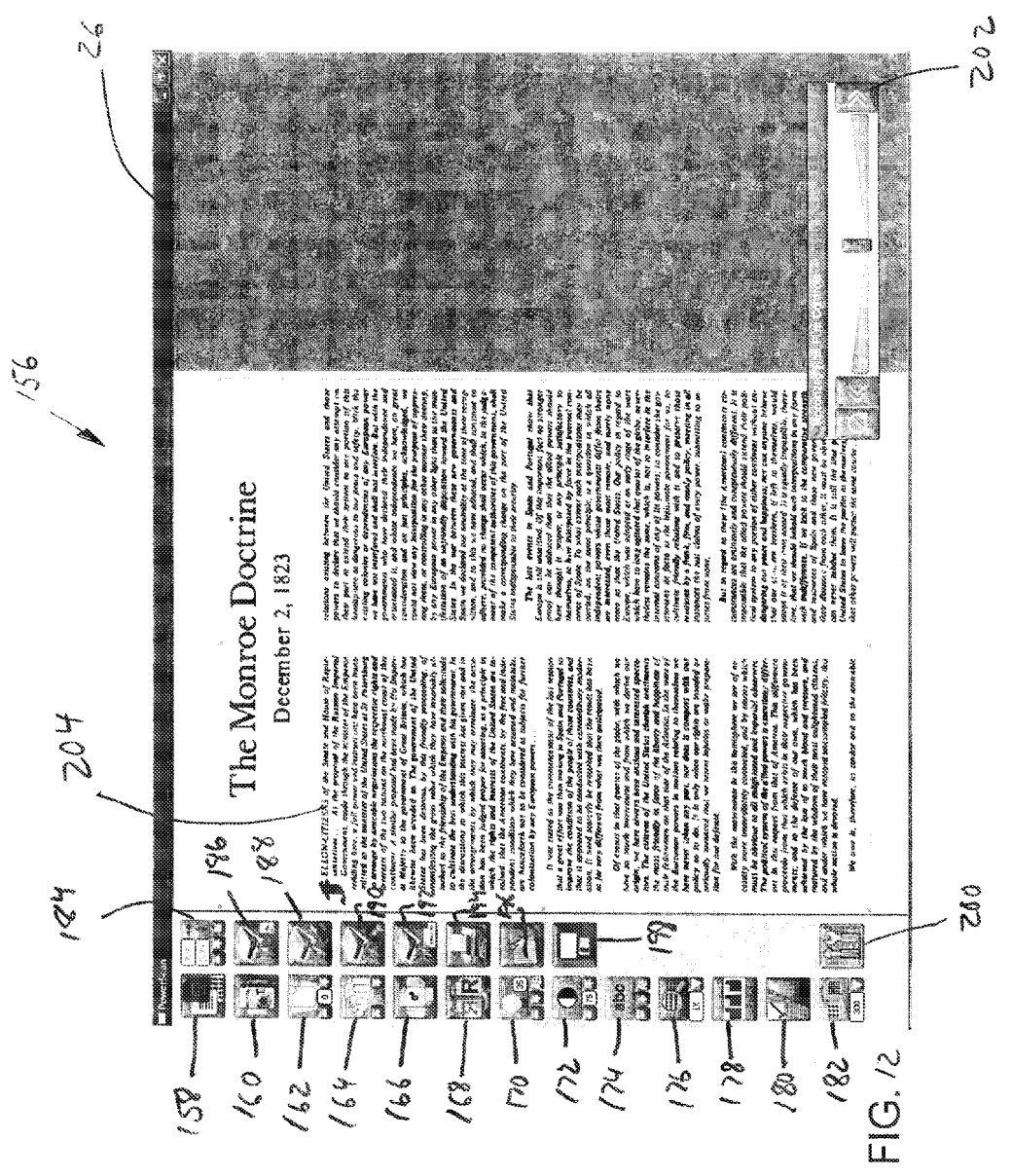

Computer 24 can include a software computer user interface (CUI) 156 displayed by display 26 with user inputs to control DMIA 22 in general, and particularly, illumination system 36, motors 100, 108 and 118, and other elements of DMIA 22. Referring to FIG. 12, CUI 156 can include the following software user input buttons: positive/negative film type 158; landscape/portrait film orientation 160; rotate optical 162 for rotating third motor 118; optical zoom 164 which controls first motor 100 and second motor 108; digital image rotation 166; mirror image 168 for adjusting for when media 46 is placed on support 44 upside down; brightness 170 which adjusts the speed of sensor 97; contrast 172; focus 174 with manual focus (−/+) and autofocus (AF), also controlling first motor 100; digital magnifier 176; live button 178; scan type/selecting grayscale, grayscale enhanced, halftone 180; resolution/image capture 182; scan size button for prints/fit to page 184; save image scan to computer drive #1 186; save image scan to computer drive #2 188; save image scan to computer drive #3 190; save image scan to email 192; print image 194; restore settings 196; save settings 198; setup/tools 200; and motorized roll film controls 202 for embodiments with motorized roll film attachments. A programmer with ordinary skill in the art in Windows, or other, operating systems, and C++ or Visual Basic programming language can create the CUI 156 as shown in FIG. 12 and defined above. CUI 156 images the image data 204 from sensor 97 on display 26.

Illumination source 36 can alternatively include lasers or laser diodes, electroluminescent panels, light sources with narrow band light filters, or other monochromatic sources. Media 46 can include any microform image formats such as microfilm/microfiche, aperture cards, jackets, 16 mm or 35 mm film roll film, cartridge film and other micro opaques. Micro opaques are different than transparent film. Images are recorded on an opaque medium. To view these micro images one needs to use reflected light. The present invention can use LED arrays 37 (FIGS. 6 and 7) for use with micro opaques, which can be the same, or similar to, the monochromatic LED's that are used in illumination source 36.

Figure 13:
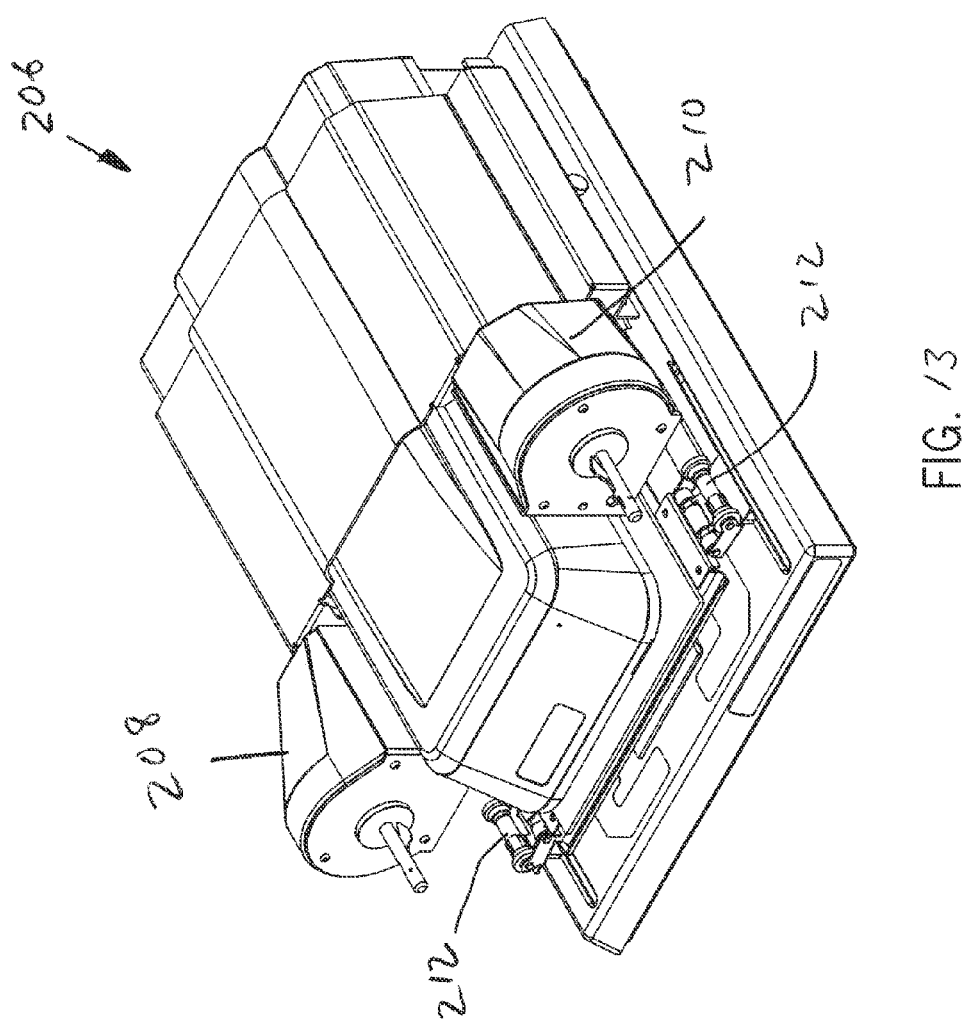
FIG. 13 is a perspective view of another embodiment of a digital microform imaging apparatus according to the present invention, particularly illustrating a motorized roll film microform media support.

In the embodiment of FIG. 13, DMIA 206 includes a microform media support in the form of motorized roll film attachment which has a supply side 208 and a take up side 210 and film guides 212, in addition to X-Y table 44. In the embodiment of FIG. 14, DMIA 214 includes a microform media support in the form of hand operated roll film attachment which has a supply side 216 and a take up side 218 with cranks 220, and film guides 222, in addition to X-Y table 44. In other ways, DMIAs 206 and 214 are similar to or the same as DMIA 22. Therefore, the microform media support structure according to the present invention is at least one of a X-Y table, a motorized roll film carrier, and a hand operated roll film carrier, and a cartridge film carrier.

A preferred embodiment of the invention has been described in considerable detail. Many modifications and variations to the preferred embodiment described will be apparent to a person of ordinary skill in the art. Therefore, the invention should not be limited to the embodiments described. Rather, in order to ascertain the full scope of the invention, the claims which follow should be referenced.

I claim:

1. A digital microform imaging apparatus, comprising:
    a chassis,
    a fold mirror supported by the chassis and including a reflecting surface for directing light from a first optical axis to a second optical axis;
    a first elongated and substantially strait lead member supported by the chassis and aligned along a substantially horizontal axis, the first lead member including an elongated shaft;
    a first drive mechanism supported by the chassis and extending alongside and spaced apart from the first lead member;
    a first motor including a first motor shaft that engages the first drive mechanism;
    a first carriage coupled to the first lead member for movement there along and coupled to the chassis via the first drive mechanism and the first motor such that rotation of the first motor shaft causes the first carriage to move along the first lead member along a trajectory that is substantially parallel to the second optical axis;
    an area sensor supported by the first carriage and aligned with the second optical axis for movement along the second optical axis within a first range to adjust a distance between the area sensor and the fold mirror; and
    a lens supported by the chassis along the second optical axis and positioned between the area sensor and the fold mirror;
    wherein the lens and area sensor are located on a first lateral side of the first lead member and located on a first lateral side of the first drive mechanism.

2. The apparatus of claim 1 wherein the lens and the area sensor are located between the first drive mechanism and the first lead member.

3. The apparatus of claim 1 wherein the fold mirror has a top edge and wherein the first lead member is located at a height below the top edge of the fold mirror.

4. The apparatus of claim 3 wherein the first drive mechanism is supported at a height below the top edge of the fold mirror.

5. The apparatus of claim 3 wherein the first drive mechanism includes a toothed belt.

6. The apparatus of claim 5 further including a toothed pulley on the first shaft that engages the toothed belt.

7. The apparatus of claim 6 further including a second carriage supported for movement along an axis that is substantially parallel to the second optical axis, a second motor having a second motor shaft and a second drive mechanism coupled to the second carriage, the lens mounted to the second carriage, the second drive mechanism coupling the second motor shaft to the second carriage so that rotation of the second shaft causes the lens to move along the second optical axis.

8. The apparatus of claim 7 wherein the second motor shaft extends along an axis that is substantially parallel to the second optical axis.

9. The apparatus of claim 8 wherein the second drive mechanism includes a second toothed belt coupled to the second motor shaft.

10. The apparatus of claim 9 wherein the second drive mechanism further includes a threaded member that extends along an axis that is parallel to the second optical axis and wherein the second carriage engages a thread formed by the threaded member, the second motor shaft linked to the threaded member via the second toothed belt such that as the second motor shaft rotates, the second toothed belt causes the threaded member to rotate about the axis that the threaded member extends along.

11. The apparatus of claim 10 wherein the second carriage includes at least one tooth member that engages the thread formed by the threaded member to drive the second carriage along a substantially horizontal axis as the threaded member rotates.

12. The apparatus of claim 11 wherein the threaded member forms a thread on an outside surface thereof.

13. The apparatus of claim 10 wherein the axis about which the threaded member extends along is located at a height below the top edge of the fold mirror.

14. The apparatus of claim 13 wherein the second carriage is also supported by the first lead member for movement along the second optical axis.

15. The apparatus of claim 13 wherein a toothed gear links the second toothed belt to the threaded member.

16. The apparatus of claim 13 wherein the lens is movable through a second range of motion along the second optical axis and wherein the first and second ranges of motion at least somewhat overlap.

17. The apparatus of claim 13 wherein the first and second motors are independently controllable.

18. The apparatus of claim 13 wherein the first and second motors are simultaneously operated to move the lens and the area sensor at the same time.

19. The apparatus of claim 18 wherein the simultaneous operation of the motors is controlled to at least somewhat maintain focus while adjusting zoom.

20. The apparatus of claim 1 wherein the lens is supported for movement within a second range along the second optical axis to change the position of the lens with respect to the fold mirror and the area sensor.

21. The apparatus of claim 7 wherein rotation of the first motor affects a zoom adjustment and rotation of the second motor affects a focus adjustment.

22. The apparatus of claim 1 further including a second elongated and substantially strait lead member supported by the chassis, the second lead member substantially parallel to and spaced from the first lead member, the first carriage also coupled to the second lead member for motion there along.

23. The apparatus of claim 22 wherein the second carriage is also supported by the first and second lead members.

24. The apparatus of claim 23 wherein the first carriage is mounted to the first and second lead members to slide there along.

25. The apparatus of claim 1 wherein the first motor is stationary with respect to the chassis while the first carriage moves along the second optical axis.

26. The apparatus of claim 1 wherein the first motor shaft is substantially parallel to the first lead member.

27. The apparatus of claim 22 wherein each of the first and second lead members includes first and second ends and wherein the fold mirror is supported adjacent the first ends of the lead members.

28. The apparatus of claim 1 further including a microform media support structure supported by the chassis and configured to support a microform media within a plane substantially orthogonal to first optical axis that is aligned with the fold mirror so that light along the first optical axis passes through supported microform media prior to reflecting off the fold mirror.

29. The apparatus of claim 28 wherein the distance along the second optical axis between the fold mirror and the sensor array is greater than the distance along the first optical axis between the media support structure and the fold mirror.

30. The apparatus of claim 29 further including a first illumination source controllable to direct light along the first optical axis that passes through a first microform media supported by the media support structure and a second illumination source controllable to direct light toward a second microform media supported by the media support structure so that the light reflects from the microform media toward the fold mirror.

31. The apparatus of claim 1 wherein the fold mirror reflects the light such that an angle between the first optical axis and the second optical axis is substantially 90 degrees.

32. The apparatus of claim 7 further including a cover subassembly supported by the chassis, the cover subassembly forming an enclosed space, the motors, area sensor, lens, fold mirror, first lead member, first drive mechanism and first and second carriages located within the enclosed space, the cover subassembly including front and rear ends, the front end proximate the first ends of the first and second lead members.

33. The apparatus of claim 32 further including a supply side roll film attachment and a take up side roll film attachment supported by the chassis adjacent opposite sides of the front end of the cover subassembly.

34. The apparatus of claim 33 further including a microform media support structure supported by the chassis and configured to support a microform media within a plane substantially orthogonal to first optical axis that is aligned with the fold mirror so that light along the first optical axis passes through supported microform media prior to reflecting off the fold mirror wherein the media support structure is supported by the chassis for movement along at least one horizontal direction within the plane that is substantially orthogonal to the first optical axis.

35. The apparatus of claim 34 wherein the at least one horizontal direction is substantially parallel to the second optical axis.

36. The apparatus of claim 1 wherein the first lead member includes a first lead screw.

37. The apparatus of claim 34 wherein the media support structure further includes a first window, a second window and a frame, the first window supported by the frame and the second window hingedly mounted to the frame along a rear edge of the second window proximate a rear edge of the first window, a lever extending from the second window proximate the rear edge of the second window, the frame and first and second windows supported by the chassis for sliding motion along an axis that is substantially parallel to the second optical axis between at least a first position where the first optical axis passes through the first and second windows and a second position where the first and second windows are spaced from the first optical axis, the lever traveling along a path during movement of the frame from the first position to the second position, a ramp supported by the chassis proximate the front end of the housing and within the path that the lever travels during movement between the first and second positions so that the lever contacts the ramp and the second window is angled upward with respect to the first widow when the frame and first and second windows are in the second position.

38. The apparatus of claim 28 wherein the supply side roll film attachment and a take up side roll film attachment are supported by the frame adjacent opposite sides of the front end of the cover subassembly for sliding movement along with the frame between the first and second positions.

39. The apparatus of claim 33 wherein film supported by the supply side and take up side attachments travels through the first optical axis along a trajectory perpendicular to the first optical axis.

40. The apparatus of claim 34 wherein a diffusing element is located between a light source and the microform media support structure.

41. A digital microform imaging apparatus, comprising:
a chassis,
a first elongated and substantially strait lead member supported by the chassis and aligned along a substantially horizontal axis, the first lead member including first and second ends;
a fold mirror supported by the chassis at the first end of the first lead member, the fold mirror including a reflecting surface for directing light from a first optical axis to a second optical axis, the fold mirror having a top edge;
a first drive mechanism supported by the chassis and extending alongside and spaced apart from the first lead member and substantially parallel to the second optical axis;
a first carriage supported by the first lead member for movement along a trajectory substantially parallel to the first lead member;
a first motor having a first motor shaft, the first motor and the first drive mechanism linking the first carriage to the chassis and the first motor shaft engaging the first drive mechanism to move the first carriage along the first lead member through a first range of motion as the first motor shaft rotates;
an area sensor supported by the first carriage for movement therewith to adjust a distance between the area sensor and the fold mirror, the area sensor aligned with the second optical axis;
a second drive mechanism supported by the chassis and extending alongside and spaced apart from the first lead member;
a second carriage supported by the second drive mechanism for movement along a trajectory substantially parallel to the first lead member;
a second motor having a second motor shaft and supported by the chassis, the second drive mechanism coupling the second motor to the second carriage to move the second carriage along the trajectory substantially parallel to the first lead member through a second range of motion; and
a lens supported by the second carriage and positioned between the area sensor and the fold mirror along the second optical axis;
wherein the first lead member is supported at a height below the top edge of the fold mirror.

42. The apparatus of claim 41 wherein the first drive mechanism is also located at a height below the top edge of the fold mirror.

43. The apparatus of claim 41 wherein the first lead member is located to one lateral side of the lens and the area sensor.

44. The apparatus of claim 43 wherein the first drive mechanism is located to one lateral side of the lens and the area sensor.

45. The apparatus of claim 44 wherein the first lead member and the first drive mechanism are on opposite sides of the lens and the area sensor.

46. The apparatus of claim 44 wherein the first drive mechanism and the first lead member are substantially coplanar with the second optical axis.

47. The apparatus of claim 41 wherein the second motor shaft extends along an axis that is substantially parallel to the second optical axis.

48. The apparatus of claim 41 wherein the second drive mechanism further includes a threaded member that extends along an axis that is parallel to the second optical axis and wherein the second carriage engages a thread formed by the threaded member, the second motor shaft linked to the threaded member such that as the second motor shaft rotates, the second toothed belt causes the threaded member to rotate about the axis that the threaded member extends along.

49. The apparatus of claim 48 wherein the threaded member forms a thread on an outside surface thereof.

50. The apparatus of claim 48 wherein the axis about which the threaded member extends along is located at a height below the top edge of the fold mirror.

51. The apparatus of claim 50 wherein the first and second ranges of motion at least somewhat overlap.

52. The apparatus of claim 50 wherein the first and second motors are simultaneously operated to move the lens and the area sensor at the same time to at least somewhat maintain focus while adjusting zoom.

53. The apparatus of claim 41 further including a microform media support structure supported by the chassis and configured to support a microform media within a plane substantially orthogonal to first optical axis that is aligned with the fold mirror so that light along the first optical axis passes through supported microform media prior to reflecting off the fold mirror.

54. The apparatus of claim 53 wherein the media support structure is supported by the chassis for movement along at least one horizontal direction within the plane that is substantially orthogonal to the first optical axis.

55. The apparatus of claim 54 wherein the at least one horizontal direction is substantially parallel to the second optical axis.

56. The apparatus of claim 54 wherein the media support structure further includes a first window, a second window and a frame, the first window supported by the frame and the second window hingedly mounted to the frame along a rear edge of the second window proximate a rear edge of the first window, the frame and first and second windows supported by the chassis for sliding motion along an axis that is substantially parallel to the second optical axis between at least a first position where the first optical axis passes through the first and second windows and a second position where the first and second windows are spaced from the first optical axis.

57. The apparatus of claim 56 further including a lever extending from the second window proximate the rear edge of the second window, the lever traveling along a path during movement of the frame from the first position to the second position, a ramp supported by the chassis proximate the front end of the housing and within the path that the lever travels during movement between the first and second positions so that the lever contacts the ramp and the second window is angled upward with respect to the first window when the frame and first and second windows are in the second position.

58. The apparatus of claim 56 further including a supply side roll film attachment and a take up side roll film attachment that are supported by the frame adjacent opposite sides of the front end of the cover subassembly for sliding movement along with the frame between the first and second positions.

59. The apparatus of claim 58 wherein film supported by the supply side and take up side attachments travels through the first optical axis along a trajectory perpendicular to the first optical axis.

60. The apparatus of claim 59 further including a first illumination source controllable to direct light through the media support structure toward the fold mirror and a second illumination source controllable to direct light toward the media support structure away from the fold mirror.

61. The apparatus of claim 59 further including a cover subassembly supported by the chassis, the cover subassembly forming an enclosed space, the motors, area sensor, lens, fold mirror, lead members, drive mechanisms and carriages located within the enclosed space, the cover subassembly including front and rear ends, the front end located between the supply side and take up side attachments when the frame is in the first position and the first and second windows are aligned with the first optical axis.

62. The apparatus of claim 61 wherein a diffusing element is located between a light source and the microform media support structure.

63. A digital microform imaging apparatus, comprising:
a chassis,
a first elongated and substantially strait lead member supported by the chassis and aligned along a substantially horizontal axis, the first lead member including first and second ends;
a fold mirror supported by the chassis at the first end of the first lead member, the fold mirror including a reflecting surface for directing light from a first optical axis to a second optical axis, the fold mirror having a top edge;
a first drive mechanism supported by the chassis and extending alongside and spaced apart from the first lead member and substantially parallel to the second optical axis;
a first carriage supported by the first lead member for movement along a trajectory substantially parallel to the first lead member;
a first motor having a first motor shaft, the first motor and the first drive mechanism linking the first carriage to the chassis and the first motor shaft engaging the first drive mechanism to move the first carriage along the first lead member through a first range of motion as the first motor shaft rotates;
an area sensor supported by the first carriage for movement therewith to adjust a distance between the area sensor and the fold mirror, the area sensor aligned with the second optical axis;
a second drive mechanism supported by the chassis and extending alongside and spaced apart from the first lead member;
a second carriage supported by the second drive mechanism for movement along a trajectory substantially parallel to the first lead member;
a second motor having a second motor shaft and supported by the chassis, the second drive mechanism coupling the second motor to the second carriage to move the second carriage along the trajectory substantially parallel to the first lead member through a second range of motion; and
a lens supported by the second carriage and positioned between the area sensor and the fold mirror along the second optical axis;
wherein the first lead member is supported at a height below the top edge of the fold mirror and to one lateral side of the lens and the area sensor and wherein the first drive mechanism is also located at a height below the top edge of the fold mirror and to one lateral side of the lens and the area sensor.

64. A digital microform imaging apparatus, comprising:
a chassis that forms a first cavity and a substantially horizontal window;
a housing cover that forms a second cavity, the cover supported by the chassis with a front portion of the cover positioned above the horizontal window and the second cavity extending rearward from the front portion to a rear portion, the front portion of the housing spaced from the horizontal window by a gap;
a first illumination source supported within one of the cavities to direct light along a first optical axis through the horizontal window and the gap and toward the other of the cavities;
a fold mirror including a reflecting surface, the fold mirror supported within the other of the cavities so that the reflecting surface forms a substantially 45 degree angle with the first optical axis and directs light along a substantially horizontal second optical axis that forms a substantially 90 degree angle with the first optical axis, the second optical axis extending away from the reflecting surface and into the other of the cavities;
a first carriage supported in the other of the cavities for motion along a trajectory that is substantially parallel to the second optical axis;
a second carriage supported in the other of the cavities for motion along a trajectory that is substantially parallel to the second optical axis;
an area sensor supported by the first carriage within the other of the cavities and aligned along the second optical axis;
a lens supported by the second carriage within the other of the cavities and aligned along the second optical axis between the fold mirror and the area sensor;
a first motor supported in the other of the cavities and coupled to the first carriage for driving the first carriage to positions where the area sensor is at different locations along the second optical axis;
a second motor supported in the other of the cavities and coupled to the second carriage for driving the second carriage to positions where the lens is at different locations along the second optical axis; and
a microform media support structure supported by the chassis and configured to support a microform media within a plane substantially orthogonal to the first optical axis and so that the first optical axis passes through the microform media, the media support structure located within the gap between the front portion of the housing and the horizontal window.

65. The apparatus of claim 64 further including a supply side roll film attachment and a take up side roll film attachment supported by the chassis and located on opposite lateral sides of one of the first and second cavities.

66. The apparatus of claim 65 wherein the supply side roll film attachment and a take up side roll film attachment are supported by the chassis and located on opposite lateral sides of one of the other of the cavities.

67. The apparatus of claim 66 wherein the supply side roll film attachment and the take up side roll film attachment are mounted to the microform media support structure and wherein the microform media support structure is mounted to the chassis via elongated brackets for sliding motion along a longitudinal direction that is substantially parallel to the second optical axis between a forward position and a rearward position in which the roll film attachments are located on opposite lateral sides of the other of the cavities.

68. The apparatus of claim 67 further including couplers supported by the brackets, the microform media support structure mounted to the couplers for sliding motion along a direction transverse to the second optical axis.

69. The apparatus of claim 68 wherein the couplers include rods that are mounted to the brackets via bearings for sliding motion along the direction transverse to the second optical axis.

70. The apparatus of claim 69 wherein the brackets are mounted to the chassis via bearings for sliding motion along the longitudinal direction.

71. The apparatus of claim 68 wherein the roll film attachments are supported by the brackets so that the microform media support structure moves along the direction transverse to the second optical axis independent of the roll film attachments.

72. The apparatus of claim 71 wherein the roll film attachments are stationary as the microform media support structure moves along the direction transverse to the second optical axis.

73. The apparatus of claim 68 wherein the roll film attachments are supported such that the roll film attachments are restricted to movement along directions parallel to the second optical axis.

74. The apparatus of claim 68 wherein the microform media support structure includes at least a first media support window that moves along the longitudinal direction as the microform media support structure slides along the longitudinal direction, the first media support window positionable at locations between and including first and second end locations along the longitudinal direction, when in the first end location, the first media support window vertically overlapping the supply side roll film attachment and, when in the second end location, the first media support window vertically overlapping the take up side roll film attachment.

75. The apparatus of claim 74 further including first and second film guides mounted to opposite sides of the media support structure, the first film guide longitudinally aligned with the supply side roll film attachment and the second film guide longitudinally aligned with the take up side roll film attachment.

76. The apparatus of claim 75 wherein the first and second film guides move along with the media support structure along each of the longitudinal direction and the direction transverse to the second optical axis.

77. The apparatus of claim 76 wherein the second cavity is the other of the cavities.

78. The apparatus of claim 64 wherein the second cavity is the other of the cavities.

79. The apparatus of claim 74 wherein the media support structure further includes a second media support window and a frame, the first window supported by the frame and the second window hingedly mounted to the frame along a rear edge of the second window proximate a rear edge of the first window, a lever extending from the second window proximate the rear edge of the second window, the frame and first and second windows supported by the chassis for sliding motion along the longitudinal direction between at least a first position where the first optical axis passes through the first and second windows and a second position where the first and second windows are spaced forward of the first position, the lever traveling along a path during movement of the frame from the first position to the second position, a ramp mounted to the cover housing proximate the front end of the housing and within the path that the lever travels during movement between the first and second positions so that the lever contacts the ramp and the second window is angled upward with respect to the first widow when the frame and first and second windows are in the second position.

80. The apparatus of claim 74 further including a second illumination source supported in the other of the cavities to direct light toward the media support structure so that light may reflect from a microform media supported by the support structure toward the fold mirror.

81. The apparatus of claim 64 further including a threaded driving mechanism between the second motor and the second carriage wherein the motor rotates the driving mechanism about an axis that is parallel to the second optical axis and wherein the second carriage includes at least one tooth received in a groove formed by a thread of the driving mechanism.

82. The apparatus of claim 81 wherein the axis about which the driving mechanism rotates is different than the second optical axis.

83. The apparatus of claim 82 wherein the shaft of the second motor rotates about an axis that is substantially parallel to the second optical axis.

84. The apparatus of claim 64 wherein the first and second motors include first and second shafts, respectively, each of the first and second shafts extending perpendicular to the first optical axis.

85. The apparatus of claim 84 wherein the axis about which the first and second motors rotate are different axis.

86. The apparatus of claim 64 wherein the housing cover, the fold mirror and the first illumination source are stationary with respect to the chassis.

87. The apparatus of claim 64 wherein the media support structure further includes a first window, a second window and a frame, the first window supported by the frame and the second window hingedly mounted to the frame along a rear edge of the second window proximate a rear edge of the first window, a lever extending from the second window proximate the rear edge of the second window, the frame and first and second windows supported by the chassis for sliding motion along an axis that is substantially parallel to the second optical axis between at least a first position where the first optical axis passes through the first and second windows and a second position where the first and second windows are spaced forward from the first position, the lever traveling along a path during movement of the frame from the first position to the second position, a ramp supported by the chassis proximate the front end of the housing and within the path that the lever travels during movement between the first and second positions so that the lever contacts the ramp and the second window is angled upward with respect to the first widow when the frame and first and second windows are in the second position.

88. The apparatus of claim 87 further including a supply side roll film attachment and a take up side roll film attachment supported by the chassis and located on opposite lateral sides of one of the first and second cavities, the first window having a width dimension, the supply side roll film attachment and the take up side roll film attachment spaced apart by a dimension that is less than the width dimension of the first window.

89. The apparatus of claim 87 wherein the ramp is supported by and extends downward from an undersurface of the housing cover.

90. The apparatus of claim 89 wherein the second cavity is the other of the cavities.

91. A digital microform imaging apparatus, comprising:
a chassis;
a housing cover that forms a cavity, the cover supported by the chassis with a front portion of the cover positioned above the front portion of the chassis and the cavity extending rearward from the front portion to a rear portion, the front portion of the housing spaced from the chassis by a gap;
a fold mirror including a reflecting surface, the fold mirror mounted within the front portion of the housing cover and positioned so that the reflecting surface forms a substantially 45 degree angle with a substantially vertical first optical axis and directs light along a substantially horizontal second optical axis that forms a substantially 90 degree angle with the first optical axis, the second optical axis extending away from the reflecting surface and into the cavity;
an area sensor supported within the cavity for movement along the second optical axis;
a lens supported within the cavity between the fold mirror and the area sensor for movement along the second optical axis;
a bracket supported by the chassis adjacent the gap for sliding motion with respect to the chassis along a longitudinal direction substantially parallel to the second optical axis between first and second positions;
a coupler supported by the bracket within the gap for sliding motion with respect to the bracket along a transverse direction substantially perpendicular to the second optical axis;
a microform media support structure supported by the coupler for sliding motion along with the coupler substantially perpendicular to the second optical axis, the media support structure configured to support a microform media within a plane substantially orthogonal to the first optical axis, the media support structure horizontally aligned with the gap for sliding motion within the gap along the transverse direction and along the longitudinal direction, wherein the media support structure is moveable along the longitudinal direction between a forward position and a rearward position;
a supply side roll film attachment supported by the bracket for sliding motion therewith along the longitudinal direction; and
a take up side roll film attachment supported by the bracket for sliding motion therewith along the longitudinal direction;
wherein the supply side and take up side roll film attachments are located on opposite lateral sides of the front portion of the housing cover when the media support structure and roll film attachments are in the rearward position.

92. The apparatus of claim 91 wherein the housing cover includes a top surface at a first height and wherein the supply side and take up side roll attachments are located at a second height that is below the first height.

93. The apparatus of claim 92 wherein the housing cover includes a bottom edge at a third height and wherein the second height is above the third height.

94. The apparatus of claim 91 wherein the housing cover includes a bottom edge at a first height and wherein the supply side and take up side roll attachments are located at a second that is above the first height.

95. The apparatus of claim 91 wherein the mirror includes top and bottom edges at first and second heights and wherein the lens and the area sensor are located between the first and second heights.

96. The apparatus of claim 91 wherein the media support structure further includes a first window, a second window and a frame, the first window supported by the frame and the second window hingedly mounted to the frame along a rear edge of the second window proximate a rear edge of the first window, a lever extending from the second window proximate the rear edge of the second window, the lever traveling along a path during movement of the frame from the rearward position to the forward position, a ramp supported by the chassis proximate the front end of the housing and within the path that the lever travels during movement between the rearward and forward positions so that the lever contacts the ramp and the second window is angled upward with respect to the first widow when the frame and first and second windows are in the second position.

97. The apparatus of claim 91 wherein the coupler includes rods that are mounted to the bracket via bearings for sliding motion along the direction transverse to the second optical axis.

98. The apparatus of claim 97 wherein the bracket is mounted to the chassis via bearings for sliding motion along the longitudinal direction.

99. The apparatus of claim 91 wherein the roll film attachments are supported by the brackets so that the microform media support structure moves along the direction transverse to the second optical axis independent of the roll film attachments.

100. The apparatus of claim 91 wherein the roll film attachments are stationary as the microform media support structure moves along the transverse direction.

101. The apparatus of claim 91 wherein the roll film attachments are supported such that the roll film attachments are restricted to movement along directions parallel to the second optical axis.

* * * * *